United States Patent
Kahn

(10) Patent No.: US 12,413,977 B2
(45) Date of Patent: *Sep. 9, 2025

(54) ACCESS CONTROLLING NETWORK ARCHITECTURES UTILIZING NOVEL CELLULAR SIGNALED ACCESS CONTROL AND MACHINE-LEARNING TECHNIQUES TO IDENTIFY WHEN AUTOMATED PROGRAMMABLE ENTITIES (SUCH AS ROBOTS/BOTS) MIMIC HUMANS AND METHODS FOR USE THEREOF

(71) Applicant: STARKEYS LLC, New York, NY (US)

(72) Inventor: Ari Kahn, Mt. Shasta, CA (US)

(73) Assignee: STARKEYS LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,256

(22) Filed: Nov. 9, 2023

(65) Prior Publication Data

US 2024/0171976 A1 May 23, 2024

Related U.S. Application Data

(63) Continuation of application No. 18/068,352, filed on Dec. 19, 2022, now Pat. No. 11,832,101, which is a
(Continued)

(51) Int. Cl.
*H04L 29/06* (2006.01)
*H04W 12/06* (2021.01)
*H04W 12/08* (2021.01)

(52) U.S. Cl.
CPC ......... *H04W 12/08* (2013.01); *H04W 12/068* (2021.01)

(58) Field of Classification Search
CPC ............... H04W 12/08; H04W 12/068; G06F 2221/2103; G06F 2221/2133; G06F 21/34;
(Continued)

(56) References Cited

U.S. PATENT DOCUMENTS

| 5,524,142 A | 6/1996 | Lewis et al. |
| 6,381,317 B1 | 4/2002 | Bala et al. |

(Continued)

FOREIGN PATENT DOCUMENTS

| WO | 2016141629 A1 | 9/2016 |
| WO | 2022020690 A2 | 1/2022 |

OTHER PUBLICATIONS

Maciej, Bartlomiejczyk, and Mirosław Kurkowski. "Multifactor authentication protocol in a mobile environment." IEEE Access 7 (2019): 157185-157199. (Year: 2019).*

(Continued)

*Primary Examiner* — Ka Shan Choy
(74) *Attorney, Agent, or Firm* — Greenberg Traurig, LLP

(57) ABSTRACT

In some embodiments, an exemplary access controlling network architecture may include: a computer platform configured to: receive, from an online entity, an action performance request; request, from an access controlling platform, an expected access control digital key to be presented to the online entity; receive the expected access control digital key; instruct to display the expected access control digital key at a computing device; cause a mobile originating communication, having the expected access control digital key and an identity linked to the computing device; determine a lack of a receipt of the access authentication indicator associated with the online entity from the access controlling platform; and perform, due to, for example, the online entity being a BOT, one of: modifying
(Continued)

a visual schema of the online entity, disabling the online entity, or suspending one of: a performance of the online entity or the performance of the action by the online entity.

20 Claims, 10 Drawing Sheets

Related U.S. Application Data continuation of application No. 17/750,392, filed on May 22, 2022, now Pat. No. 11,533,619.

(58) Field of Classification Search
CPC ........ G06F 21/36; G06F 21/44; G06F 21/554; H04L 63/0853
See application file for complete search history.

(56) References Cited

U.S. PATENT DOCUMENTS

| | | |
|---|---|---|
| 6,487,602 B1 | 11/2002 | Thakker |
| 6,868,267 B1 | 3/2005 | Briggs et al. |
| 7,319,855 B1 | 1/2008 | Brune et al. |
| 7,321,656 B2 | 1/2008 | Bevente et al. |
| 7,403,603 B2 | 7/2008 | Tikiks et al. |
| 7,487,213 B2 | 2/2009 | Zager et al. |
| 7,502,455 B2 | 3/2009 | Crockett et al. |
| 7,603,102 B1 | 10/2009 | Pryor |
| 7,945,242 B2 | 5/2011 | Kahn |
| 8,009,816 B2 | 8/2011 | Syrjala et al. |
| 8,149,848 B2 | 4/2012 | Karaoguz et al. |
| 8,275,119 B2 | 9/2012 | Kahn |
| 8,725,637 B2 | 5/2014 | Bixler et al. |
| 8,818,328 B2 | 8/2014 | Kahn |
| 8,862,751 B2 | 10/2014 | Faccin et al. |
| 8,874,635 B2 | 10/2014 | Mustafa |
| 8,886,773 B2 | 11/2014 | Papakostas et al. |
| 8,954,032 B1 | 2/2015 | Stoler |
| 9,264,552 B2 | 2/2016 | Kahn |
| D778,269 S | 2/2017 | Kahn et al. |
| 9,924,356 B2 | 3/2018 | McQueen |
| 10,110,706 B2 | 10/2018 | Chen et al. |
| 10,116,805 B2 | 10/2018 | Lu et al. |
| 10,142,322 B2 | 11/2018 | Thodupunoori et al. |
| 10,187,528 B2 | 1/2019 | Kahn |
| 10,298,749 B2 | 5/2019 | Mumick et al. |
| 10,311,413 B2 | 6/2019 | Storeh et al. |
| 10,341,498 B2 | 7/2019 | Kahn |
| 10,499,287 B1 | 12/2019 | Sharma et al. |
| 10,579,787 B1 * | 3/2020 | Mallenahally .......... H04L 63/08 |
| 10,728,385 B2 | 7/2020 | Kahn |
| 10,986,504 B1 | 4/2021 | Smith et al. |
| 2004/0042597 A1 | 3/2004 | Atkins et al. |
| 2004/0053598 A1 | 3/2004 | Book et al. |
| 2004/0067747 A1 | 4/2004 | Carpenter et al. |
| 2004/0199475 A1 | 10/2004 | Rivest et al. |
| 2004/0213409 A1 | 10/2004 | Murto et al. |
| 2004/0258229 A1 | 12/2004 | Mayron |
| 2005/0009500 A1 | 1/2005 | Ear |
| 2005/0102242 A1 | 5/2005 | Omidyar |
| 2005/0177506 A1 | 8/2005 | Rissanen |
| 2005/0188010 A1 | 8/2005 | Valk |
| 2006/0053293 A1 | 3/2006 | Zager et al. |
| 2006/0256941 A1 | 11/2006 | Kahn |
| 2007/0071218 A1 | 3/2007 | Zhang |
| 2007/0208864 A1 | 9/2007 | Flynn et al. |
| 2008/0091489 A1 | 4/2008 | Larock et al. |
| 2008/0177638 A1 | 7/2008 | Butler |
| 2008/0229399 A1 | 9/2008 | O'Neil et al. |
| 2008/0243650 A1 | 10/2008 | Yoon |
| 2009/0070262 A1 | 3/2009 | Olliphant et al. |
| 2009/0198619 A1 | 8/2009 | Tripunitara et al. |
| 2009/0275307 A1 | 11/2009 | Kahn |
| 2010/0069036 A1 | 3/2010 | Pericas et al. |
| 2010/0293017 A1 | 11/2010 | Merritt et al. |
| 2011/0077949 A1 | 3/2011 | Olliphant et al. |
| 2012/0064860 A1 | 3/2012 | O'Neil et al. |
| 2012/0083243 A1 | 4/2012 | Kahn |
| 2014/0316982 A1 | 10/2014 | Brown et al. |
| 2014/0323082 A1 | 10/2014 | Browne et al. |
| 2014/0324696 A1 | 10/2014 | Browne et al. |
| 2015/0242601 A1 * | 8/2015 | Griffiths ................ H04L 63/105 726/5 |
| 2015/0350459 A1 | 12/2015 | Isobe et al. |
| 2015/0365512 A1 | 12/2015 | MacKenzie et al. |
| 2016/0127210 A1 | 5/2016 | Noureddin et al. |
| 2016/0127902 A1 * | 5/2016 | Ciarniello ............... G06F 21/43 380/247 |
| 2016/0286393 A1 * | 9/2016 | Rasheed ............. H04L 63/0853 |
| 2016/0345176 A1 | 11/2016 | DeWitt et al. |
| 2016/0374132 A1 | 12/2016 | Yerrabommanahalli et al. |
| 2017/0063925 A1 | 3/2017 | Votaw et al. |
| 2017/0068947 A1 | 3/2017 | Xie et al. |
| 2017/0078494 A1 | 3/2017 | Kahn |
| 2017/0126682 A1 | 5/2017 | Wong et al. |
| 2017/0213404 A1 | 7/2017 | Sivalingam et al. |
| 2017/0237822 A1 | 8/2017 | Kahn |
| 2017/0257363 A1 * | 9/2017 | Franke ................ H04W 12/069 |
| 2017/0329615 A1 | 11/2017 | Kahn |
| 2018/0315086 A1 | 11/2018 | Morse et al. |
| 2018/0336326 A1 * | 11/2018 | Wallace ................ G06F 21/577 |
| 2020/0145384 A1 | 5/2020 | Chauhan |

OTHER PUBLICATIONS

Maciej, BarUomiejczyk, and Mirostaw Kurkowski. "Multifactor authentication protocol in a mobile environment." IEEE Access 7 (2019): 157185-157199. (Year: 2019).

Micropayments: A Viable Business Model?, 1 page (2011). rittps://cs.stanford.edu/people/eroberts/cs201/projects/2010-11/MicropaymentsAndTheNet/history.html.

Thorpe, Esther Kezia, Why micropayments aren't dead yet, 16 pages (2020)_ https://whatsnewinpublishing.com/why-micropayments-arent-dead-yet/.

Nielsen, Jakob, "The Case for Micropayments," 5 pages (1998). https://www.nngroup.com/articles/the-case-for-micropayments/.

Rosenberg, Scott, "The micropayments mirage," Trent Micor, 9 pages (2021). https://www.google.com/amp/slwww.axios.com/micropayments-mirage-subscriptions-payments-online-84aff6f2-o24d-4f1f-afdf-e10a71104b17.html.

Lesk, Michaek, "Micropayments: An Idea Whose Time Has Passed Twice?," Digital Rights, 3 pages (2004). https://www_google.com/url?sa=t&source=web&rct=j&url=https://www_cpe.ku.ac.th/-mcs/courses/2005_02/214573/ papers/micro payments.odf&ved=2ahUKEwilt5Xes9j0AhVEbsOKHaFUCbgQFnoECAUQAQ&usg=AOvVaw120sw9ZhgKv4ZXITldsWsL.

Case, Amber, Who Killed the micropayment? A history. 16 pages (2003)_ https://caseorganic.medium.com/who-killed-the-micropayment-a-history-ec9e6eb39d05.

Shea, Ryan, "Micropayments, Abridged," 9 pages (2019)_ https://medium.com/radartech/micropayments-abridged-2f110302677c.

Birch, David G.W. "Micropayments Are A Macro Opportunity," 6 pages (2021). https://www.google.com/amp/slwww.forbes.com/sites/davidbirch/2021/05/16/micropayments-are-a-macro-opportunity/!imp/.

Coinpedia, "The Road Not Taken: Browser-Based Micropayments and History of Error 402," 11 pages (2021).

Rivest, Robert L., "Pepperooin Micropayments," Proceedings Financial Cryptograhy, Springer, 8 pages (2004); http://www.springer.de/oomp/lncs/index.html.

Nelson, Ted, "The Babbage of the web," The Economist, 9 pages (2000).

Tufekci, Zeynep, "Shouldn't We All Have Seamless Micropayments By Now?," 3 pages (2019).

* cited by examiner

| SCHEMA | COLOR | ENTITY | CHANNEL |
|---|---|---|---|
|  | Gray | BOT | Generic, Uncategorized |
| 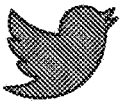 | Red | BOT | Health, Medical, Research etc. |
|  | Orange | BOT | News, Politics, Publications, Opinions, Polls, etc. |
|  | Green | BOT | Marketing, Products, Endorsements, etc. |
|  | Blue | HUMAN | Multi-Channel |
|  | Purple | BOT | Academic, Non-Profits, Governmental, etc. |
FIG. 5

ACCESS CONTROLLING NETWORK ARCHITECTURES UTILIZING NOVEL CELLULAR SIGNALED ACCESS CONTROL AND MACHINE-LEARNING TECHNIQUES TO IDENTIFY WHEN AUTOMATED PROGRAMMABLE ENTITIES (SUCH AS ROBOTS/BOTS) MIMIC HUMANS AND METHODS FOR USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Ari Kahn, All Rights Reserved.

CROSS-REFERENCE TO RELATED APPLICATIONS

The present application is related to and claims the benefit of the earliest available effective filing date(s) from the following listed application(s) (the "Related Applications") (e.g. claims earliest available priority dates for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 17/567,044, entitled "CELLULAR SYSTEMS HAVING ELEMENTS MODIFIED TO TRANSFORM AND/OR OPERATE CELLULAR COMMUNICATION SIGNALS IN ACCORDANCE WITH NOVEL CELLULAR COMMUNICATIONS PROTOCOLS AND NETWORK ARCHITECTURES UTILIZING CELLULAR NETWORK HOSTED ACCESS CONTROLLING SCHEMAS, AND METHODS FOR USE THEREOF", filed 31 Dec. 2021, which is currently co-pending or is an application of which a currently co-pending application is entitled to the benefit of the filing date.

For purposes of the USPTO extra-statutory requirements, the present application constitutes a continuation-in-part of U.S. patent application Ser. No. 17/567,051, entitled "CELLULAR SYSTEMS HAVING ELEMENTS MODIFIED FOR ACCESS CONTROL BASED ON EXPECTATION DATA RECORDS IN ACCORDANCE WITH NOVEL CELLULAR COMMUNICATIONS PROTOCOLS AND NETWORK ARCHITECTURES UTILIZING CELLULAR NETWORK HOSTED ACCESS CONTROLLING SCHEMAS, AND METHODS FOR USE THEREOF", filed 31 Dec. 2021, which is currently co-pending or is an application of which a currently co-pending application is entitled to the benefit of the filing date.

FIELD OF TECHNOLOGY

This subject matter relates to, without limitations, access controlling network architectures utilizing novel cellular signaled access control and machine-leaning techniques to identify, rank, modify, and/or control visual schemas of automated programmable entities (e.g. robots/bots) (APES) and methods for use thereof.

BACKGROUND

Typically, cellular communication signals associated with a cellular communication may utilize a Basic Call State Model (BCSM) and control points that may govern communication setup, progression and other call-related actions in an Intelligent Network (IN) (communications network). In one example, where the communication may be a mobile originated telephony call request, a network switching element (e.g. MSC) may receive a call setup request, and in turn request call processing instructions from a network controlling element (e.g. SCP/SCF) that may rely on one or more additional devices/systems (e.g. OCS) to determine various aspects of the call, including a decision to proceed with the call. Legacy and Analog User Name And Password (UNAP) based security is severely compromised, given that many users opt for convenience over security, choosing easier to remember passwords rather than stronger more cryptic ones, and moreover reusing the same password across multiple services. Large scale data security breaches and privacy concerns has undermined online trust, with increased risk and exposure further eroding the UNAP method for gaining access to services. Users have also become increasingly reluctant to disclose personal data to online entities.

In the digital universe, for example, without limitation, to access various networks, users are typically required to enter analog names and passwords in order to identify themselves, and thereby register and gain access to services. Typically, usernames, without limitations, may include actual names, pseudonyms, email addresses, screen names, and any other, relatively easy, discoverable personal information of users.

Summary of Described Subject Matter

In some embodiments, the present disclosure provides various exemplary technically improved methods, one method may include, without limitation, at least steps of: receiving, by a computing platform, over a computer network, from an online entity, an action performance request, requesting a performance of at least one action with the computer platform; requesting, by the computing platform, from an access controlling platform, an expected access control digital key to be presented to the online entity; receiving, by the computing platform, from the access controlling platform, the expected access control digital key; transmitting, by the computing platform, a computer instruction configured to: instruct to display the expected access control digital key at a computing device; cause a mobile originating communication to be received by the access controlling platform, where the mobile originating communication includes: the expected access control digital key and an identity linked to the computing device; and cause the access controlling platform to generate an access authentication indicator when the access controlling platform receives the expected access control digital key and the identity linked to the computing device; determining, by the computing platform, in response to the transmitting the computer instruction, a lack of a receipt of the access authentication indicator associated with the online entity from the access controlling platform; and performing, by the computing platform, at least one of: modifying at least one visual parameter of a visual schema of the online entity to visually identify the lack of the receipt of the access authentication indicator, disabling the online entity, or suspending at least one of: a performance of the online entity or the performance of the at least one action by the online entity.

In some embodiments, the present disclosure provides various exemplary technically improved computer platforms, one computer platform may include, without limitation, at least the following components: at least one processor in communication with a non-transitory computer readable medium storing application program instructions; where the application program instructions, when executed, cause the at least one processor to: receive, over a computer network, from an online entity, an action performance request, requesting a performance of at least one action with the computer platform; request, from an access controlling platform, an expected access control digital key to be presented to the online entity; receive, from the access controlling platform, the expected access control digital key; transmit a computer instruction configured to: instruct to display the expected access control digital key at a computing device; cause a mobile originating communication to be received by the access controlling platform, where the mobile originating communication includes: the expected access control digital key and an identity linked to the computing device; and cause the access controlling platform to generate an access authentication indicator when the access controlling platform receives the expected access control digital key and the identity linked to the computing device; determine, in response to the transmitting the computer instruction, a lack of a receipt of the access authentication indicator associated with the online entity from the access controlling platform; and perform at least one of: modifying at least one visual parameter of a visual schema of the online entity to visually identify the lack of the receipt of the access authentication indicator, disabling the online entity, or suspending at least one of: a performance of the online entity or the performance of the at least one action by the online entity.

In some embodiments, one method may further include and/or component(s) of one computer platform may be further programed for: modifying, by the computing platform, the at least one visual parameter of the visual schema to visually identify the online entity to be a BOT.

In some embodiments, the at least one action is to establish a user profile in an online environment managed by the computer platform.

In some embodiments, the at least one action is to submit an electronic submission to an online environment managed by the computer platform.

In some embodiments, the computer platform is a social media platform; where the electronic submission is an electronic posting; and where the modifying the at least one visual parameter of the visual schema of the online entity to visually identify the lack of the receipt of the access authentication indicator, further including: modifying, by the computing platform, the at least one visual parameter of the posting to visually identify the posting to be from the BOT.

In some embodiments, the at least one visual parameter is selected from at least one color theme.

In some embodiments, one method may further include and/or component(s) of one computer platform may be further programed to: obtain, by the computing platform, BOT activity data for the BOT; utilizing, by the computing platform, a trained machine-learning model to determine, based on the BOT activity data, at least one classification, at least one ranking, or both, for at least one of: the BOT or the electronic submission; and modifying, by the computing platform, based on the at least one classification, the at least one ranking, or both, at least one of: the at least one visual parameter of the visual schema of the BOT or the at least one visual parameter of the electronic submission by the BOT.

In some embodiments, the at least one classification is associated with at least one of: a classification of a plurality of domains, a classification of a plurality of activity categories, or a classification of a plurality of source categories.

In some embodiments, one method may further include and/or component(s) of one computer platform may be further programed for: identifying, by the computing platform, based on the at least one classification, a particular theme; and modifying, by the computing platform, the at least one visual parameter based on the particular theme.

In some embodiments, the trained machine-learning model that includes a ranking algorithm configured to score the BOT, the electronic submission by the BOT, or both, based on at least one ranking metric selected from at least one of: a number of links referencing the electronic submission, another electronic submission by the BOT, or both; a number of citations referencing the electronic submission, another electronic submission by the BOT, or both; a number of citations referencing the electronic submission, another electronic submission by the BOT, or both; a number of likes associated with the electronic submission, another electronic submission by the BOT, or both; a number of real user followers who follow the BOT; or any combination thereof.

In some embodiments, the at least one ranking metric is a confidence ranking.

In some embodiments, the at least one confidence ranking is based on a confidence score measured at a particular scale; where the modifying of the at least one visual parameter of the visual schema of the BOT, the at least one visual parameter of the electronic submission, or both, further including: determining, by the computing platform, based on the at least one classification and the confidence score, a particular theme; and modifying, by the computing platform, the at least one visual parameter of the visual schema of the BOT, the at least one visual parameter of the visual schema of the electronic submission, or both, based on the particular theme.

In some embodiments, the confidence score is a percent value.

In some embodiments, the visual schema of the BOT, the visual schema of the electronic submission, or both, include a schema element having a visual appearance corresponding to the percent value of the confidence score.

In some embodiments, the present disclosure provides various exemplary technically improved methods, one method may include, without limitation, at least steps of: generating, by an access controlling platform, an expected access control digital key for authenticating a computing device that is operationally linked to the at least one access-restricted digital resource for accessing at least one access-restricted digital resource; storing, by the access controlling platform, the expected access control digital key in a computer memory associated with the access controlling platform; causing, by the access controlling platform, to display the expected access control digital key at the computing device; receiving, by the access controlling platform, a mobile originating communication, having: a particular access control digital key and an identity linked to the computing device; performing, by the access controlling platform, a confirmation of the particular access control digital key of the access requesting data with the expected access control digital key, stored in the computer memory associated with the access controlling platform; transmitting, by the access controlling platform, when the confirmation is successful, an access authentication indicator; and where the access authentication indicator is configured to cause to unlock the at least one access-restricted digital resource for accessing at the computing device.

In some embodiments, the present disclosure provides various exemplary technically improved systems that may include, without limitation, at least the following components: at least one processor in communication with a non-transitory computer readable medium storing application program instructions; where the application program instructions, when executed, cause the at least one processor to: generate an expected access control digital key for authenticating a computing device that is operationally linked to at least one access-restricted digital resource for accessing the at least one access-restricted digital resource; record the expected access control digital key in a computer memory associated with the access controlling platform; cause to display the expected access control digital key at the computing device; receive a mobile originating communication, having: a particular access control digital key and an identity linked to the computing device; perform a confirmation of the particular access control digital key of the access requesting data with the expected access control digital key, stored in the computer memory associated with the access controlling platform; transmit, when the confirmation is successful, an access authentication indicator; and where the access authentication indicator is configured to cause to unlock the at least one access-restricted digital resource for accessing at the computing device.

In some embodiments, the mobile originating communication is a telephone call; and the method further includes: answering, by the access controlling platform, the telephone call and releasing, by the access controlling platform, the telephone call momentarily thereafter, once a sufficient time passes for generating a session data record associated with the identity.

In some embodiments, the sufficient time is less than or equal to 1 second.

In some embodiments, the mobile originating communication is in accordance with a mobile originating cellular communications protocol.

In some embodiments, the mobile originating cellular communications protocol is one of: a Telephone call setup request, a Short Message Service request, or an Unstructured Supplementary Services Data request.

In some embodiments, the mobile originating communication is received based on a symbolic routing prefix, including at least one symbol; and the mobile originating communication includes symbolically prefixed address signals, specifying a combination of the symbolic routing prefix and the particular access control digital key.

In some embodiments, the mobile originating communication is received when the mobile originating communication includes address signals, specifying the particular access control digital key that exceeds a pre-determined maximum number of digits.

In some embodiments, the pre-determined number of digits exceeds the maximum 15 digits in accordance with a e.164 telephone number address specification.

In some embodiments, the identity linked to the computing device is: a cellular identity or derived from the cellular identity; and the cellular identity identifies: a cellular device that is programmatically associated with the computing device or the computing device that is a cellular service-enabled device.

In some embodiments, the cellular identity is one of: a Mobile Station International Subscriber Directory Number (MSISDN), an International Mobile Subscriber Identity (IMSI), an Integrated Circuit Card Identification Number (ICCID), or an International Mobile Equipment Identity (IMEI).

In some embodiments, the expected access control digital key is a sequence of numbers or alphanumeric characters.

In some embodiments, the generating the expected access control digital key further includes: utilizing, by the access controlling platform, a random generator to generate the sequence of numbers or alphanumeric characters.

In some embodiments, the causing to display the expected access control digital key at the computing device, further including: returning, by the access controlling platform, the expected access control digital key or a combination of a symbolic routing prefix and the expected access control digital key to the computing device in response to an application programming interface (API) call.

In some embodiments, the causing to display the expected access control digital key at the computing device, further including: transmitting, by the access controlling platform, the expected access control digital key or a combination of a symbolic routing prefix and the expected access control digital key to a provider computing device that is: operationally linked to the at least one access-restricted digital resource to allow for accessing the at least one access-restricted digital resource by the computing device, and configured to instruct the computing device to display the combination of the symbolic routing prefix and the expected access control digital key or a link encoded with the combination of the symbolic routing prefix and the expected access control digital key.

In some embodiments, one method may further include and/or component(s) of one system may be further programed for: encoding, by the access controlling platform, the expected access control digital key or the combination of the symbolic routing prefix and the expected access control digital key into a barcode; where the retuning the expected access control digital key to the computing device in response to the API call, further including: retuning the barcode to the computing device or instructing the computing device to generate the barcode encapsulating the access control digital key; where the causing, by the access controlling platform, to display the expected access control digital key at the computing device, further including: the causing to display the barcode.

In some embodiments, one method may further include and/or component(s) of one system may be further programed for: encoding, by the access controlling platform, the expected access control digital key or the combination of the symbolic routing prefix and the expected access control digital key into a barcode; where the transmitting the expected access control digital key to the provider computing device, further including: transmitting the barcode to the provider computing device; where the provider computing device is further configured to instruct the computing device to display the barcode.

In some embodiments, the barcode is a quick response (QR) code or a n-dimension code.

In some embodiments, the at least one access-restricted digital resource includes at least one of: an access-restricted internet content or an access-restricted internet service.

In some embodiments, one method may further include and/or component(s) of one system may be further programed for: associating, by the access controlling platform, the access authentication data with an entity that is associated with the provider computing device.

In some embodiments, one method may further include and/or component(s) of one system may be further programed for: generating, by the access controlling platform, when the confirmation is successful, an access authentication expectation data, including an identity data based on the identity; and where the access authentication expectation data, including: a first component that is the identity data and, and a second component that is at least one static symbol; and transmitting, by the access controlling platform, the access authentication expectation data; when the computer device receives an input of the second component of the access authentication expectation data, the input is associated with a request for accessing at least one subsequent access-restricted digital resource: receiving, by the access controlling platform, at least: another mobile originating communication having a particular identity linked to a particular computing device, and an internet-based communication having the first component of the access authentication expectation data; performing, by the access controlling platform, another confirmation of the particular identity to the first component of the access authentication expectation record; transmitting, by the access controlling platform, when the another confirmation is successful, another access authentication indicator that is configured to cause to unlock the at least one subsequent access-restricted digital resource for accessing at the computing device.

In some embodiments, one method may further include and/or component(s) of one system may be further programed for: generating, by the access controlling platform, an access authentication expectation record based on the access authentication expectation data.

In some embodiments, the at least one symbol and the at least one static symbol is the same.

In some embodiments, one method may further include and/or component(s) of one system may be further programed for: utilizing, by the access controlling platform, at least one cryptographic hash function to encrypt the identity linked to the computing device into an unique cryptographically hashed identity linked to the computing device; and utilizing, by the access controlling platform, the unique cryptographically hashed identity linked to the computing device to generate at least one component of the identity data.

In some embodiments, one method may further include and/or component(s) of one system may be further programed for: adding, by the access controlling platform, at least one number, at least one alphabetic character, the at least one static symbol, or any combination thereof, to a front of the unique cryptographically hashed identity, to a back of the unique cryptographically hashed identity, or both, to generate the at least one component of the identity data.

In some embodiments, the identity linked to the computing device is a cellular identity or derived from the cellular identity; where cellular identity is one of: a Mobile Station International Subscriber Directory Number (MSISDN), an International Mobile Subscriber Identity (IMSI), an Integrated Circuit Card Identification Number (ICCID), or an International Mobile Equipment Identity (IMEI); where the adding the at least one number, the at least one alphabetic character, the at least one static symbol, or any combination thereof, to the front of the cryptographically hashed identity, the back of the cryptographically hashed identity, or both, further including: selecting, by the access controlling platform, the at least one number, the at least one alphabetic character, or both, from the IMSI, the MSISDN, the ICCID, the IMEI, or any combination thereof.

In some embodiments, one method may further include and/or component(s) of one computer platform may be further programed for: activating, by the computing platform, in response to the transmitting the computer instruction, a timer having a pre-determine duration; and where the determining the lack of the receipt of the access authentication indicator associated with the online entity from the access controlling platform, further including: determining, by the computing platform, in response to the transmitting the computer instruction and after the time expires, the lack of the receipt of the access authentication indicator associated with the online entity from the access controlling platform.

In some embodiments, the present disclosure provides various exemplary technically improved methods, one method for determining a cellular identity at an internet hosted service may include, without limitation, at least steps of: generating a series of random decimal digits presented by the Internet hosted service; receiving from a cellular device, address signals matching the series of randomly generated digits; extracting the cellular identity of the device emitting the matching signals; and transmitting the cellular identity, or transmitting a unique identity derived from the cellular identity, to the Internet hosted service.

In some embodiments, the present disclosure provides various exemplary technically improved methods, one method for encrypting a personal identification (PI) number may include, without limitation, at least steps of: applying a cryptographic hash function to the PI; augmenting the cryptographically hashed PI with a series of the ending digits of the PI, thereby enabling the hashed PI to be easily recognizable to a human. In some embodiments, based on one or more principles disclosed herein, the cryptographically hashed PI may be held in volatile computer memory for ad hoc actions.

In some embodiments, the PI is one of an MSISDN, ICCID, IMEI, IMSI, a passport number, a social security number, a national identity number or any globally unique number.

In some embodiments, the augmenting is by pre-fixing or post-fixing to the cryptographically hashed PI.

In some embodiments, the PI is a public or private cryptographic key and the augmented digits are taken from the end (e.g. from the right hand side) of MSISDN, ICCID, IMEI, or IMSI.

In some embodiments, the PI is presented or referenced by the augmented digits.

BRIEF DESCRIPTION OF THE DRAWINGS

Various embodiments of the present disclosure can be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 5 is an illustrative non-restrictive example of an aspect of a binary bot detection process by inference based at least in part on cellular communication signals in accordance with at least some embodiments of the present disclosure.

DETAILED DESCRIPTION

Figure 1A:
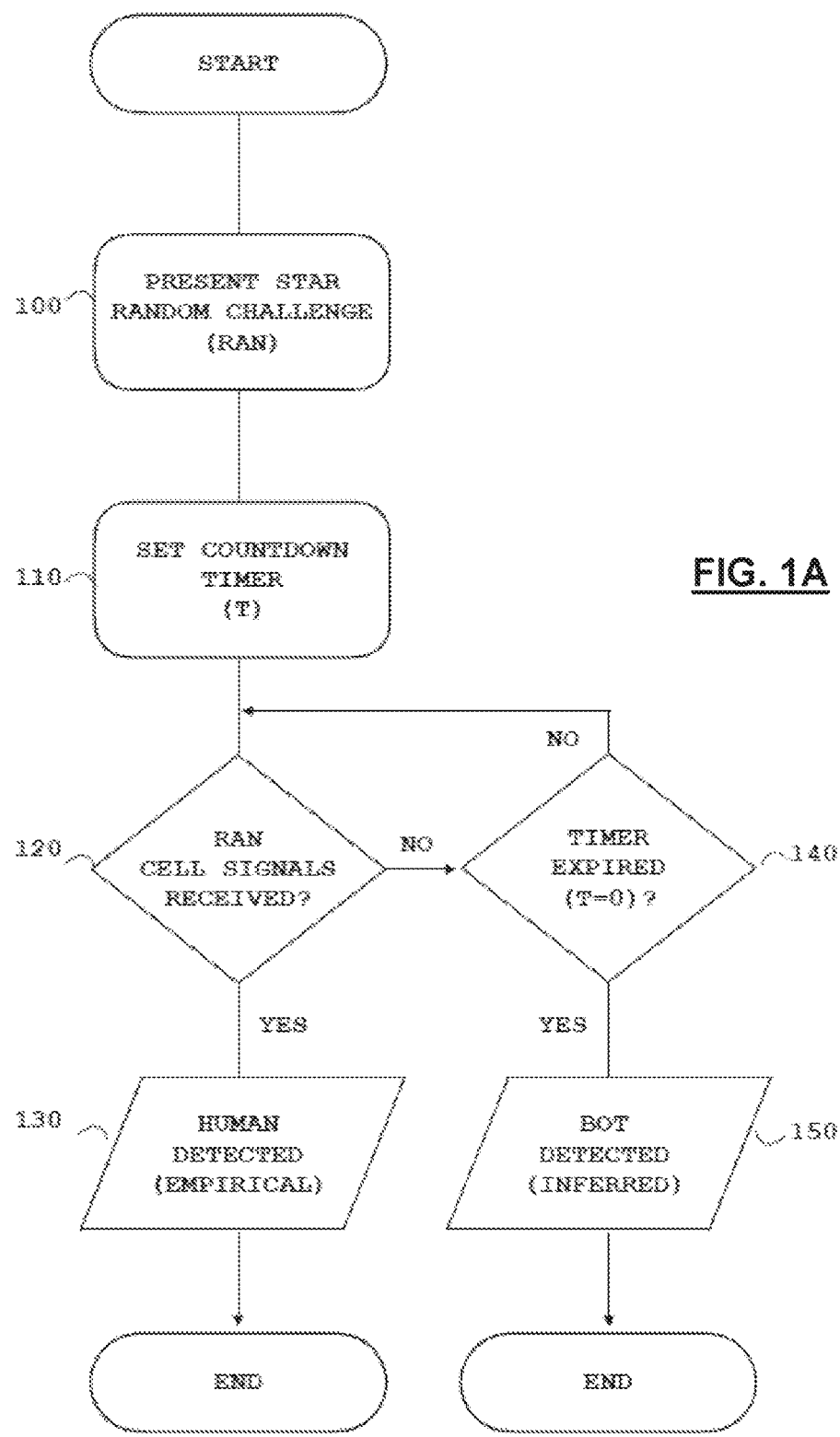
FIG. 1A is an illustrative non-restrictive example of a binary bot detection process by inference based at least in part on cellular communication signals in accordance with at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Some Illustrative Non-Limiting Technological Problems being Addressed Herein

One technological problem being addressed in the present disclosure is that Legacy and Analog User Name And Password (UNAP) based security may be severely compromised, given that many users opt for convenience over security, by choosing easier to remember passwords rather than stronger, more cryptic ones, and/or moreover reusing the same password across multiple services. For example, large scale data security breaches and privacy concerns has undermined online trust, with increased risk and exposure further eroding the UNAP method for gaining access to services. Typically, users may have also become increasingly reluctant to disclose personal data to online entities.

Another technological problem being addressed in the present disclosure is that users may enter their identities via a keypad or keyboard that may be a fundamental vulnerability because, for example, keystrokes are, typically, not encrypted at keypress (entry) time and may be intercepted, for example, by keyloggers and/or remote control software. Thus, regardless of how secure the internet communications protocol may be, data manually entered into the device using a keypad or keyboard could be captured by nefarious actors in plain and clear text or in an equivalent and associated text code (e.g. ASCII).

Yet another technological problem being addressed in the present disclosure is that usernames and passwords, moreover, may be often required to be stored by third party service providers who may often fail to take the necessary data protection precautions. A number of large scale data breaches and leaks have exposed and rendered the online identity of millions vulnerable.

Yet another technological problem being addressed in the present disclosure is that nefarious actors, such as scammers and phishers, may utilize computer-driven social engineering techniques to extract login credentials from unsuspecting users at alarming frequency.

Yet another technological problem being addressed in the present disclosure is that with the advent of smart cellular phones and app stores, countless application providers have gained access to computer data storages of deeply personal data, device controllers and features, such as, without limitation, access to contacts, telephone events, screen recordings, cameras and/or keypads. For example, users may grant habitually, without diligence, access permissions to third party applications and/or application features requested by software that may be outside the scope of services being rendered. Consequently, at least some consider the modern digital cellular telephone to be a security pandoras box.

Yet another technological problem being addressed in the present disclosure is the deficiency in securely verifying users via their cell numbers, given that many Internet Services use the MSISDN to deliver a two-factor authentication (2FA) communications. For example, in one typical 2FA procedure, a computing device of an Internet Service may send a One Time Passcode (OTP) via SMS and/or phone calls to a registered mobile device using the MSISDN, requesting users to reenter these codes into an expectant internet authentication session.

Yet another technological problem being addressed in the present disclosure is that there may be no known way to effectively detect BOTS (computer programs that are configured/programmed to perform automatic repetitive tasks) operating on a service platform at scale given that many services willfully provide an API to automate core components of their own service offering, for example, without limitation, to automatically respond to messages, to schedule responses to messages, to respond selectively to messages by topic and/or key words, to automatically follow other users, to create lists of users, to spot trends in the market place, to automatically react to trends, to conduct research, conduct online polls, disseminate news, etc.

Online social media platforms (e.g. Meta™/Facebook™/ WhatsApp™ (Meta Platforms, Inc., CA), Twitter™ (Twitter, Inc., CA), etc.), may lack an automated method to, for example, without limitation, detect, highlight, and/or tag automated computer processes (e.g. "BOTS" or robots) that may register and masquerade themselves as humans. For example, while BOTS may provide valuable automated services, they can also not only artificially inflate the number of registered subscribers, and moreover may also disseminate false and/or misleading information to sway a public opinion and/or utilize computer technology for malicious purposes such as, without limitation, undermining the freedom of speech and democratic processes.

For example, there is a technological need for Authentic Beings (humans) and their input to be clearly distinguished and distinctly presented from input created by Artificial Entities (i.e. Automatons, BOTS) which may be malevolent in content and/or intent. At least one reason this segregation is so fundamental to restoring balance online, is the quintessential issue regarding the protection of free speech in digital ecosystem(s), between permitting free speech while ensuring truth based on data supporting facts prevail. This balance is literally a numbers game. For example, since typically BOTS are artificially spawned and programmatically injected into online systems, they may exist in vast quantities that far exceed the number of humans who are required to manually register to participate online. That statistic alone creates a non-level playing field of epic proportions, one that dramatically statistically and tangibly skews not only the source of data, but its reliability and its ability to sway online opinions at will, for example BOTS increasing or decreasing the prominence of a post (tweet), posing an existential threats to democratic free and fair processes (e.g. elections).

For example, this problem has been recently and very publicly highlighted by the business personality Elon Musk, who recently made an acquisition bid (of $44 billion) to acquire Twitter™ however has recently sowed doubt into the proposed deal by questioning the authenticity of the Twitter's Base, claiming that a significantly larger portion than the publicly stated 5% (as filed with the Securities and Exchange Commission) of the disclosed base are BOTS.

Twitter is typically considered to be one of the most influential online forums, as it permits people (and BOTS) to post (Tweet) commentary on and debate topical issues in real-time to a vast captive audience who are actively engaged following influencers and reposting comments online adding momentum behind trending topics that "go viral". During a recent technology conference, The All-in Summit 2022 (Miami, May 15-17, 2022), Musk discussed the fundamental challenge and issue at hand as follows: "Right now I am (sort of) debating the number of BOTS on Twitter . . . Currently what I am being told is that there is just no way to know the number of BOTS, it like as un-knowable as the human soul, basically, you have no idea the level of witchcraft and alchemy that is needed to determine what the BOT percentage is. And I said [to Twitter] why not just try calling people? That would be one of the things to do. Have you tried calling them? . . . Obviously you can have an account that looks exactly like a human account or is being operated where one person is operating a thousand accounts, but that person can only buy one toaster, they not going to buy a thousand toasters, so you care about, like, the number of unique real people, uh, that are on the system. It's extremely fundamental." May 16, 2022, All-In Podcast, (https://www.youtube.com/watch?v=CnxzrX9tNoc). Particularly, Musk contends that if that number is significantly higher (20% or even 90%) than currently acknowledged, that would constitute a material breach in public disclosure for a publicly traded company, which in turn would dramatically impact its true and real value. A material breach that would equally impact the purchase of a single share as it does the entire company. For example, the current inability to accurately determine the percentage of the on-line base that are BOTS has negative commercial domino effects since, advertising to the base is a material revenue contributor to the company. In particular, advertising that is sold on the number of digital views (also referred to as "brand" or "mindshare" advertising) rather than necessarily on conversions (click throughs and product purchases), since if a significant portion of advertisements are unknowingly being served to BOTS, they cannot be deemed "viewed" (by a potential customer) yet currently they are being billed as such.

Particularly, Musk suggests (to Twitter), "Why not just try calling people [to determine if they are real humans]?" (i.e. when calls get answered a conversation can confirm their identity). While such an analog test would be conclusive, clearly it would be economically unsustainable as it simply cannot be performed effectively and efficiently at scale. Consequently, it would not be a practical solution, both with respect to time and cost.

Yet another technological problem being addressed in the present disclosure is that some 2FA processes/systems may allow malicious actors to gain access to the phone-based messaging (e.g. SMS) and/or telephony functions to intercept the 2FA codes and control automatically users' cellular-service enabled computing devices to return the 2FA codes via the IAPP to complete the authentication loop, without users' intervention and/or users' appreciation of consequences of their action(s) in facilitating malicious actors.

Yet another technological problem being addressed in the present disclosure is that a legacy SS7 signaling network, being typically utilized to transport these 2FA codes and calls, may have a number of vulnerabilities that permit malicious actors with access to an SS7 peering point, to redirect and/or intercept such mobile terminating events, compromising these authorization codes and/or signals. For example, at least some vulnerabilities may be due to a case when, for example, without limitation, a source of SS7 messages may not be authenticated and critical network controlling messages may thus be injected into the SS7 network from one or more entities, masquerading as mobile phones and/or switching elements. Thus, for example, without limitation, a malicious actor could inject and thereby, for example, fake a mobile telephone location update (or similarly overwrite subscriber information in an HLR, etc.), hijacking the cellular routing to surreptitiously intercept phone calls and/or text.

Yet another technological problem being addressed in the present disclosure is that some Authenticator applications may be programmed to push notifications over data connections to registered cellular devices, prompting a user confirmation before granting access to online resources (e.g. services).

Yet another technological problem being addressed in the present disclosure is that while purporting to overcome at least one or more of identified 2FA issues, at least some Authenticator applications may cause attention deficit disorder (ADD), muscle memory and/or poor hand-eye coordination, which could result in users habitually and/or inadvertently granting access. For example, ADD may manifest as a bipolar disorder that may result in ADD-suffering users pressing/selecting, for example, the "Green"-color button or a button with the label of "YES" when they have intended to press the "Red"-color button or a button with the label of "NO".

Yet another technological problem being addressed in the present disclosure is that significant number (e.g. potentially, billions) of cellular users still use only so-called "basic feature" phones that typically lack so-called "advanced" data push notification services (e.g. web push notifications, rich push notifications carrying images, emojis, etc.) they cannot avail themselves of such "higher-end" authentication protocols such as.

Yet another technological problem being addressed in the present disclosure is that, while certain user interactions preclude automation through programmatic instruction, there is a phenomenon known as "click farming" which utilize low skilled and/or low wage human resources, mostly in developing countries, to perform manual clicks (e.g. manually activating a user interface element) on behalf of actors with nefarious intent to bypass certain authentication processes. For example, click farms may be used to effectively bypass Captcha-type systems that may present visual recognition tasks and/or puzzles to be solved that are designed to distinguish between human and machine input.

Some Illustrative Non-Limiting Technological Solutions Described Herein

As detailed herein, at least some embodiments of the present disclosure are directed to one or more technological solutions that are designed to address one or more of technological problems identified herein by, for example, without limitation, providing security enhancing methods, access controlling network architectures, and systems for identifying and authenticating users in various environments, such as, without limitation, online. For example, at least some embodiments of the present disclosure may leverage the secure Mobile Originating Signaling capability on digital networks to conduct cellular-based authentication that would deliver a trusted, seamless and frictionless user identity authentication for access to digital products and/or services at scale.

As detailed herein, at least some embodiments of the present disclosure are directed to one or more technological solutions that are designed to address one or more of technological problems identified herein by, for example, without limitation, shifting the reliance, and consequently the vulnerability, from users, identifying themselves, to arrangements where a trusted intelligent network (IN), such as, without limitation, a cellular network, securely provides the identification out of internet realm/band, without any user intervention, and thereby without any additional external point of compromise (e.g. from malicious actors from the outside of the IN/cellular network).

As detailed herein, at least some embodiments of the present disclosure are directed to one or more technological solutions that are designed to address one or more of technological problems identified herein by, for example, without limitation, programming an Internet Application (IAPP) to connect, for example, without limitation, via an application programming interface (API) to an exemplary disclosed so-called "STARKEY" Platform (which may be also be referenced herein interchangeably as an access controlling platform), requesting and then presenting a user with a challenge that may include, without limitation, a series (sequence) of randomly generated digits (e.g. a sequence of numbers, a sequence of randomly generated alphanumeric characters, etc., which may be also referenced herein as an expected access control digital key). In some embodiments, the series of randomly generated digits (the expected access control digital key) may be prefixed, without limitation, prior to be presented to a user, with one or more pre-determined or randomly selected symbols (e.g. star symbol (*), a symbolic routing prefix), collectively forming so-referenced herein interchangeably the "STAR Challenge," the "STAR Random Challenge," the "Star Randomized Phone Number", the "Star Random Challenge and Response", or the "Star Challenge". In at least some embodiments, the exemplary STARKEY Platform (the access controlling platform) may be programmed to generate/form the Star Challenge. In at least some embodiments, another computing device (e.g. a user computing device, a provider computing device, described herein) may be programmed to generate/form the Star Challenge, before being presented to a user, by prefixing/appending/adding one or more pre-determined symbols to the series of randomly generated digits (the expected access control digital key). In at least some embodiments, the Star Challenge and the expected access control digital key are configured to be recognized by a user as a series of telephone digits and symbol(s) that the user can select and/or input on a telephone keypad. For example, both, the Star Challenge and the expected access control digital key, may be structured to have a sufficiently suitable number of random digits so that a malicious actor would need to try millions, billions, trillions or even quadrillions of permutations, thus making brute force attacks potentially improbable and impossible, given their cellular origination and a sufficiently suitable short lived duration as disclosed herein.

As detailed herein, without limitation and as illustration only, billions of users/people have personal cellular phones and every cellular phone has, for example, a unique digital subscriber identity, known as the MSISDN (Mobile Subscriber Integrated Services Digital Network or also referenced as a Mobile Station International Subscriber Directory Number). Each MSISDN is the directory telephone number that users dial to establish contact with one another. As detailed herein, at least some embodiments of the present disclosure are directed to one or more technological solutions that are designed to address one or more of technological problems identified herein by, for example, without limitation, utilizing each cellular phone number as a Ubiquitous/Unique Personal Digital Identity (UPDI). For example, without limitation, registering users online using their cell phone number may deliver a Globally Unique Identity (GUID) that may seamlessly work with contact lists (e.g. personal phone address books), permitting IAPP linkage and viral propagation between social address books. In some embodiments, the GUID may permit Internet Services (e.g. internet publishers, internet business), to deliver Over The Top (OTT) telephony and/or messaging applications using the existing known telephone number as the service address and an identity (e.g. user identity, computing device identity, etc.). For example, without limitation, OTT telephony and/or messaging applications may include presence-based directories, video chat, multiparty conferencing, screen-sharing and/or PSTN calling. For example, without limitation, OTT telephony and/or messaging applications may be "thick" clients, browser-based "thin" clients, and/or WebRTC (Web Real-Time Communications)-based "thin" clients.

For example, when a cellular user A with a cellular-service enabled computing device (e.g. cellular phone/smartphone) having MSISDN-A that is registered with an Internet App (IAPP) using their MSISDN-A as an identity (an entry in the modified phone address book), the IAPP and/or other associated program(s)/application(s)/network (s) may determine, for a communication addressed to the user A (MSISDN-A) from another user of the IAPP, that the recipient cellular device MSISDN-A has been registered and connected to the IAPP, and may thus route the communication OTT using an internet connection (e.g. internet network), rather than routing communications via the cellular network.

As detailed herein, at least some embodiments of the present disclosure are directed to one or more technological solutions that are designed to address one or more of technological problems identified herein by, for example, without limitation, registering users by their identities described herein (e.g. MSISDN) to facilitate IAPP service propagation and adoption since any contact that is registered with the IAPP (e.g. social media app/website) may be indicated as such in a suitably modified phone address book program, and any contact that would not yet be registered may be invited to join the IAPP community on their MSDISN, via a network (e.g. the IN, cellular network)-mediated onboarding that would rely on the modified phone address book program.

As detailed herein, at least some embodiments of the present disclosure are directed to one or more technological solutions that are designed to address one or more of technological problems identified herein by, for example, without limitation, recording a series of randomly generated digits (e.g. the expected access control digital key), or series of randomly generated digits with symbol(s) (e.g., the STAR Challenge), or any other similarly suitable data, as an expectation record in a non-transitory memory; whereby the access controlling platform may be programmed to await a receipt of a series of network (e.g. IN or cellular network)-mediated signals from an as yet unknown cellular device that would exactly match the expectation record, digit for digit in sequence. In some embodiments, once this stored expectation would be met by a user, for example, by dialing the series of randomized digits displayed in the form of the STAR Challenge, as a phone number, on a cellular device and the cellular network routing such "STAR" call request to the servicing STARKEY Platform (access controlling platform), the cellular device that emitted the matching STAR address signals (the STAR Challenge as recorded in the expectation), also referenced herein as "the Star Challenge Response," may be securely identified by extracting the cellular network-provided Caller ID (e.g. MSISDN) determined from the user and/or device (e.g. SIM) associated cellular profile stored in the cellular network.

As detailed herein, at least some embodiments of the present disclosure are directed to one or more technological solutions that are designed to address one or more of technological problems identified herein by, for example, without limitation, programming the IAPP to present a series of randomly generated digits (e.g. the expected access control digital key, a part of the STAR Challenge) as a graphical user interface (GUI) element (which may be also referenced herein as, without limitation, the STAR Challenge Element (e.g. a button having a text label of the STAR Challenge, displaying the Star Challenge randomized series of digits as a click to call button/link)). In some embodiments, the illustrative STAR Challenge element may be programed to be displayed in form of a telephone button (e.g. green-color button with an icon/image of a telephone or a telephone receiver), displaying the STAR Challenge, including the series of randomly generated digits (e.g. the expected access control digital key) that a user would activate to dial (STAR Challenge phone number), and/or a telephony QR code, encoded with the STAR Challenge (STAR Challenge phone number), permitting users to scan rather than manually input the STAR Challenge or the series of random generated digits from it, when using the IAPP, for example, without limitation, on a desktop/laptop computer or in virtual reality (VR) headset that has no native cellular phone dialing functionality. In some embodiments, without limitation, on activating (e.g. without limitation "tapping") the STAR Challenge button or scanning the QR code encapsulating the STAR Challenge phone number, the cellular phone dialer may then be presented with the randomized phone number that has been automatically populated/entered as the dial address to complete the Star Challenge Response.

As detailed herein, at least some embodiments of the present disclosure are directed to one or more technological solutions that are designed to address one or more of technological problems identified herein by, for example, without limitation, providing that when the user dials a number containing the series of randomized digits (the expected access control digital key) or a number containing the series of randomized digits prefixed with a symbolic routing prefix (e.g. the STAR Challenge random telephone number), resulting in the Star Challenge Response, by pressing a GUI element (e.g. a button that is shaped as and/or displays, without limitations, a green phone icon), the user's associated cellular device or the user's associated cellular service-enabled computing device (e.g. a tablet) would emit telephony-type address signal (e.g. STAR Challenge address signals) for example, without limitation, over the air to the cellular network, which would then execute an Authentication, Authorization and Accounting (AAA) Protocol to securely verify and authenticate the user's associated cellular device or the user's associated cellular service-enabled computing device (e.g. a tablet) based on one or more secret internal network keys (e.g. Ki, stored locally on the SIM and internally in the HLR on the network) and/or one or more security algorithms, for example, without limitations, the A3/A8 and COMP128 challenge response algorithm.

In some embodiments, on passing the AAA verification procedure, the network would provide one or more internal network identifiers (e.g. MSISDN, ICCID, IMEI, etc.) associated with the cellular device (SIM/IMSI) and route the star prefixed call to the STARKEY Platform. The STARKEY Platform may be programmed to determine when the address signals received would be expected and, optionally, for example, being time-based active, by performing a confirmation (e.g. by matching) of the received address signals to the stored randomized series on, for example, a digit-for-digit basis in the sequence, and that the call would have been received within an unexpired timer interval, and on thus verifying the expected and active challenge, extract the MSISDN associated with the device that emitted the randomized address signals. Thus, on receiving the expected and matching response to the STAR Challenge, including highly randomized digits, as disclosed herein, the STARKEY Platform may be programmed to seamlessly, securely and uniquely identify the user's associated IAPP utilizing the network (e.g. the IN, the cellular network) provided cellular identity.

As detailed herein, at least some embodiments of the present disclosure are directed to one or more technological solutions that are designed to address one or more of technological problems identified herein by, for example, without limitation, by technologically confirming that only a user (human being) who would be presently viewing the STAR Challenge displayed on the internet-enabled computing device (e.g. a tablet, a desktop computer, a cellular phone, a VR headset, a ATM machine, a gaming terminal) can respond (e.g. dial, send an SMS) with the identical sequence and series of random digits within a predetermine time interval (e.g. 1-60 seconds, under 5 minutes, under 10 minutes, 15 minutes, etc.) (e.g. the Star Challenge Response). And further, given that the response received by the STARKEY Platform would be OUT of Band (OOB), over the cellular telephony network, rather than IN Band (INB), within the IAPP internet data communications channel, the response (e.g. the Star Challenge Response) to the random challenge (e.g. the Star Random Challenge), for example, cannot be intercepted on the internet and cannot be injected via the internet.

As detailed herein, at least some embodiments of the present disclosure are directed to one or more technological solutions that are designed to address one or more of technological problems identified herein by, for example, without limitation, by technologically enabling third party service providers with a so-called "STARKEY" API (e.g. an exemplary, non-limiting delivery mechanism/channel for the STAR Challenge) to, for example, without limitation, utilize a universal and secure digital registration and access protocol based on a unique digital identity (e.g. a cellular identity), provided by, for example, without limitation, the network (e.g. the IN, cellular network) rather than the user. For example, without limitations, once a user has been identified as disclosed herein, for example, without limitation, via a Star Random Challenge Response, utilizing the STAR Challenge described herein in accordance with at least some embodiments of the present disclosure, an exemplary internet service (e.g. a website with access restricted resource, ATM, physical vending machine with internet-based authentication vending, etc.) and/or an exemplary internet application (e.g. an internet browser, an app, etc.) may store access authentication expectation data/record that may include one or more components, including a component of identity data (e.g. the identity (e.g. the cellular identity) and/or derived identity based on the identity (e.g. the cellular identity)), returned by the STARKEY Platform so as to enable the STARKEY Platform to authenticate the user by receiving subsequent mobile origination communication(s) including static signals (e.g. a fixed digit(s) (e.g. phone number), fixed alphanumeric sequence, fixed symbol(s), etc.) as address signals rather than random signal(s) (random signal(s)/random symbol(s) are signal(s)/symbol(s) that would vary between a plurality of mobile origination communications), since these static signals may be only accepted from the device associated with a now-known identity (e.g. the cellular identity).

In at least some embodiments of the present disclosure, a unique identity (e.g. cellular identity) thus may be paired with an internet service and/or application, so that, for example, without limitation, any subsequent login, any subsequent signals requested from the same user for the internet service and/or application, may be uniquely matched to an expectant and previously-paired identity before granting access.

In at least some embodiments of the present disclosure, for example, an IAPP may receive a cellular identity of a cellular-service enabled computing device A (e.g. MSISDN-A), or a cryptographically-hashed identify, e.g. so-called "XMSISDN-A" (derived from MSISDN-A) as described in more detail below utilizing, for example, without limitation, the STAR Challenge and associated API. For example, on a subsequent access to an access-restricted IAPP, the now registered and identified user, associated with a now registered identity (e.g. the registered cellular identity) may be requested (e.g. via a graphical user interface) to utilize the device associated with the now-registered identity (e.g. the registered cellular identity) to emit a static/fixed cellular signal (e.g. via telephone call, SMS etc.) (STAR signals), for example, a single symbol (e.g. a star (*)), in order to gain access (e.g. login/sign-in, etc.) to an access-restricted resource (e.g. the access-restricted IAPP).

As detailed herein, at least some embodiments of the present disclosure are directed to one or more technological solutions that are designed to address one or more of technological problems identified herein by, for example, without limitation, by technologically enabling, for example, without limitation, the STARKEY Platform via a published API utilized, for example, within a browser and/or within a native APP, to ensure that an access would be only granted to a user who would utilize, for example, without limitation, the cellular device with MSISDN-A that would emit so-called "STAR" signal(s). For example, without limitations, on requesting the user login in accordance with at least some embodiments of the present disclosure, the STARKEY Platform may thus simply record an access authentication expectation record having an access authentication expectation data such as [MSISDN-A:*], per the notation in U.S. patent application Ser. No. 17/567,051, incorporated herein by reference for at least this specific purpose. That is, performing a confirmation to the access authentication expectation data/record would only be met (successful) when, for example, without limitation, a cellular device having the identity of MSISDN-A emits address signal(s) representing a static/fixed symbol (e.g. a single Star (*) address signal), within a preset time, before granting access.

As detailed herein, at least some embodiments of the present disclosure are directed to one or more technological solutions that are designed to address one or more of technological problems identified herein by, for example, without limitation, by technologically generating/utilizing a unique so-called "STARKEY" identity (also may be interchangeably referenced herein in some embodiments as the identity data) that may be derived from, for example, without limitation, a cellular identity (e.g. MSISDN), in order to prevent exposing the cellular identity (e.g. MSISDN) to third party service providers. In at least some embodiments of the present disclosure, this derived STARKEY identity may be computed by applying a suitable cryptographic hash function (CHF) such as, without limitation, a one-way hash function (e.g. SHA-256), to the cellular identity (e.g. MSISDN), resulting in a unique identifier that is illustratively referenced herein as "XMSISDN." Since the MSISDN is a network rather than a user provided identity, at least some embodiments of the present disclosure may be detailed by utilizing notations such as, without limitation, mapping/associating (:) and transporting (>) identities from a cellular device to a cellular network, to an internet service associated with access-restricted resource(s) as follows:

Cell Phone [SIM:IMSI/TMSI]>Cell Network AAA [TMSI/IMSI:MSISDN]>The STARKEY Platform [HASH(MSISDN):XMSISDN]>Internet Service [XMSISDN]=Unique Anonymous Online Identity.

As detailed herein, at least some embodiments of the present disclosure are directed to one or more technological solutions that are designed to address one or more of technological problems identified herein by, for example, without limitation, by technologically programming an exemplary access controlling platform (e.g. the STARKEY Platform) to transmit the hashed identity, e.g. XMSISDN, rather than the clear MSISDN to an internet service provider or APP that would be associated with at least one access-restricted resource. In at least some embodiments, this hashed identity may then be stored in a browser or APP for future reference without exposing the true identity (e.g. the cellular identity) associated with the user. For example, on receiving a request to authorize the previously identified user, the STARKEY Platform may then receive the hashed identity (e.g. XMSISDN-A) from the IAPP and may then setup an internal STARKEY expectation [XA:*] (also may be interchangeably referenced herein for at least some embodiments as an access authentication expectation data/record) which would be utilized to perform the confirmation when the STARKEY Platform receives, for example, fixed symbol(s)-based address signal(s) (e.g. "*") from a MSISDN-A associated device whose cryptographic hash would equal XMSISDN-A (XA). For example, without limitation, on receiving the signal from the MSISDN-A identified computing device (e.g. a cellular phone), the STARKEY Platform may then apply the cryptographic hash function to the MSISDN on the fly (in the moment of receipt) to determine if a corresponding expectation record (XA:*) exists, and if the record does exist, the STARKEY Platform may then communicate to the internet service (e.g. via the STARKEY API), that a successful login for the user identified by the hashed XMSISDN-A has been recorded. The internet service may then securely unlock at least one access-restricted resource for accessing by the authenticated user (e.g. via an associated computing device).

As detailed herein, at least some embodiments of the present disclosure are directed to one or more technological solutions that are designed to address one or more of technological problems identified herein by, for example, without limitation, by technologically modifying an exemplary cryptographic hash function to further append (at the end) and/or prepending (at the beginning) at least the last one or more (N) digits of the MSISDN in the clear (e.g. one or more last digits) to the hashed identifier (e.g. XMSISDN) to allow users to more intuitively/readily identity cellular-service enabled computing devices (e.g. based on portion of a cellphone number) while still maintaining the integrity of the cryptographic hash (e.g. XMSISDN). In some embodiments, at least one technological solution may be to append the last three (3) digits as in MSISDNYYY (XM3, as shorthand notation herein). In some embodiments, at least one technological solution may be to append the last four (4) digits as in MSISDNYYYY (XM4, as shorthand notation herein). In some embodiments, at least one technological solution may be to append the last 5 (five) digits of the MSDSIDNYYYYY (XM5, as shorthand notation herein). In some embodiments, at least one technological solution may be to append the last N digits of the MSDSIDNN in the clear (XMN, as shorthand notation herein). For example, appending the last 4 digits in the clear thus, uniquely renders both a securely hashed and an easily recognizable short identity. In some embodiments, the so-called "STARKEY" IAPP (e.g. IAPP programmed to handle one or more unique identities of the present disclosure) may be programmed to extract and simply display those N appended digits (e.g. 4 digits) from the XMN (e.g. XM4) as the user identity (e.g. YYYY, as described, without limitation, in FIG. 1B at 108 below). For example, by simply displaying just the last 4 digits of the MSISDN, the user may readily recognize their cell identity at a glance. In some embodiments, at least one technological solution may be to prepend (prefix) the last N digits, as in N-MSISDN (NXM, as shorthand notation herein).

For example, in one non-limiting illustrative example, applying a SHA-256 cryptographic hash function to MSISDN (14154125111) would result in the XMSISDN hash:

2ea464c4a851e207dfe557f4567843eb52fe4df399233 75b2e19d3e51bbe5b86. And by then appending the last 4 MSISDN digits [5111], the XMSISDN hash would be transformed into an easily recognizable cryptographic hash XM4 as in:

2ea464c4a851e207dfe557f4567843eb52fe4df3992 3375b2e19d3e51bbe5b865111. In some embodiments, by prepending the last 4 MSISDN digits [5111], the XMSISDN hash may be transformed into an easily recognizable cryptographic hash 4XM as in:

51112ea464c4a851e207dfe557f4567843eb52fe4df 39923375b2e19d3e51bbe5b86. In some embodiments, the 4XM or XM4 presentation may be reduced down to the prepended/appended MSISDN digits, while still retaining the unique full hash hidden by the IAPP (e.g. in a browser token), simply, for example, without limitation, displaying: 5111, or *5111, #5111, STAR5111, etc.

As detailed herein, at least some embodiments of the present disclosure are directed to one or more technological solutions that are designed to address one or more of technological problems identified herein by, for example, without limitation, utilizing XMN (e.g. XM4) to represent an extended human readable and identifiable 256 bit hash, from the standard 32 bytes to 32+N/2 (e.g. 34 bytes in an XM4 notation, utilizing an extra 2 bytes or 4 hexadecimals to store the appended 4 decimal digits). In some embodiments, the same MSISDN digit extension may be applied to any hash function to generate an anonymous yet easily recognizable identity.

In at least some embodiments the MNO may provide the access controlling platform (the exemplary STAR Platform) with additional identities associated with the cellular device emitting the randomized signals per this disclosure. In at least some embodiments, these additional identifiers may, without limitation, include the ICCID and the IMEI. In at least some embodiments these additional identities may be transported in SIP Private headers. In at least some embodiments, the ICCID may be hashed together with the MSISDN, that is hashing a concatenation of the ICCID and the MSISDN, to provide an additional layer of access security.

For example, in at least some embodiments, without limitation, such a multi-factor hashed identity, including both MSISDN and ICCID as input parameters, may prevent a so-called SIM Swap Fraud since the SIM identity may now be incorporated into the hashed identity. For example, while a SIM card may be fraudulently replaced (e.g. swapped) without the true owner's permission or awareness, while retaining the associated MSISDN, the SIM cannot be replaced without the ICCID changing, since every SIM card is manufactured with a globally unique ICCID. In at least some embodiments, when the hashed identity includes both ICCID and MSISDN (XIM/XIM4 for short), then in the event that a SIM Swap occurs, the previously hashed and recorded identity associated with the cellular device and the IAPP will be invalidated, on performing a new hash. For example, in at least some embodiments, when a previously identified device identity has been hashed, recorded and associated with an IAPP, subsequent attempts to gain access on emitting a static signal from a device with the associated unchanged MSISDN, and a new ICCID (SIM swap), the access controlling platform on hashing the new ICCID+

MSISDN tuple, will fail to locate a match to the expected previous ICCID+MSISDN hash, that had been recorded and associated with the cellular device. Such a hash mismatch may then permit the access controlling platform to alert a user that a possible SIM Swap fraud has been perpetrated.

In one embodiment the access controlling platform may record two separate hashes for a single device, in an expectation record (e.g. [XM, XIM: "*"]), one on the MSISDN (XM) and another on the combined ICCID+MSISDN (XIM) in order to locate an expectation record utilizing either the single identity hash on MSISDN (XM) or the dual identity hash on both ICCID+MSISDN (XIM) and thereby conclusively ascertain that the MSISDN had been previously identified and associated and that it is the combination of ICCID+MSISDN that has failed (i.e. a SIM swap has occurred). In at least some embodiments, the Star Challenge Response methods, systems, components, and network architectures disclosed herein may utilize a plurality of network (e.g., the IN, cellular network, etc.) provided identities, associated with the same network or a plurality of networks.

As detailed herein, at least some embodiments of the present disclosure are directed to one or more technological solutions that are designed to address one or more of technological problems identified herein by, for example, without limitation, allowing users, who would have previously been identified using, for example, without limitation, the STAR Challenge, to simply without limitation initiate a Telephony, SMS or USSD transaction with particular signal(s) (e.g. STAR (*)) from their cellular device, and upon matching to, for example, the expected STAR (*) signal from their registered device, gain secure, instant and/or universal access to any access-restricted resource (e.g. internet service, website, file, etc.) without disclosing any additional personal data. As detailed herein, at least some embodiments of the present disclosure are directed to one or more technological solutions that are designed to address one or more of technological problems identified herein by, for example, without limitation, uniquely transforming (e.g. reprogramming) at least one button (e.g. the STAR (*) button) on any cellular phone into a Digital Master Key for securely unlocking access-restricted online resources (e.g. internet hosted services) as disclosed herein. In one non-limiting embodiment, for example, reprogramming the star (*) button of a telephone dialing pad to display a lock icon, and permitting the user, without limitation, to tap, or tap the star/lock icon button twice in rapid succession (e.g. a double tap), or tap and hold the star button (e.g. an extended tap) to automatically emit the static star (*) signal utilizing at least the disclosed methods. In one non-limiting embodiment, the cellular device may be programmed to enable at least one biometric trigger (e.g., voice, fingerprint, face recognition, etc.) to initiate the static star signaled methods, as disclosed, without exposing any biometric data to third parties.

As detailed herein, at least some embodiments of the present disclosure are directed to one or more technological solutions that are designed to address one or more of technological problems identified herein by, for example, without limitation, utilizing one or more additional security measures (e.g. without limitation, biometric signatures, including fingerprint sensors, facial recognition scanners, PIN codes, shape matching algorithms, and other suitable mechanism(s)) to allow users to further protect their cellular devices (e.g. telephony dialer application, SMS application, others APPs) from unauthorized use.

As detailed herein, at least some embodiments of the present disclosure are directed to one or more technological solutions that are designed to address one or more of technological problems identified herein by, for example, without limitation, utilizing Mobile Originating (MO), rather than Mobile Terminating (MT), signaling functionality to ensure at least one of signaling integrity, security and authenticity since all originating signals would be required, in at least some embodiments described herein, to pass the mandatory network AAA (Authentication Authorization and Accounting) procedures (e.g. utilizing Intelligent Network Nodes and functionality, as per International Telecommunications Union ITU-T Q.1200 series recommendations).

As detailed herein, at least some embodiments of the present disclosure are directed to one or more technological solutions that are designed to address one or more of technological problems identified herein by, for example, without limitation, allowing, online services and/or applications (e.g. Meta, Twitter, et.) to authenticate existing and/or newly registering users. In at least some embodiments, without limitation, the IAPP may present, for example, a Star Random Challenge (a process involving a Star Challenge as disclosed herein), requesting users to verify their existing accounts. In at least some embodiments, the exemplary STARKEY platform may be programmed to instruct the presentation of the Star Challenge during a service registration to correctly characterize the user account. In at least some embodiments, since the Star Challenge is predicated on a user (a person) manually activating the dial button to raise a call setup request to transport the encapsulated series of randomly generated address signals over the air toward the access controlling platform (e.g. the STARKEY Platform), and given that automated computer processes, such as BOTS and other nefarious actors and/or malicious code, cannot automatically activate such a dial request (e.g. pressing the connect call button under programmatic control), such automated computer processes are automatically excluded from completing the Star Challenge.

In at least some embodiments, since a telephone call is precluded from being conducted in the background, that is behind the currently visible application screen(s), and thus out of sight from unsuspecting users, the Star Challenge Response is programmed to necessitate that a particular user is actively engaged in the authentication process for it to complete and thereby succeed in determining that the account is an authentic, genuine user account.

Thus as described above and as detailed further below, disclosed ranked schemas are predicated on the negative outcome, or lack in response, to a Star Random Challenge as disclosed, segmenting the base by validating real (human) users when the said challenge response succeeds, and by inference, detecting non-human (BOTS) when the said Challenge response fails or is void any response. In some embodiments BOTS thus detected may be disabled (blocked) from operational activity until a secondary process is completed, for example, one that can ascertain and validate the BOTS intent and one that may more accurately identify its creator.

As detailed herein, at least some embodiments of the present disclosure are directed to one or more technological solutions that are designed to address one or more of technological problems identified herein by, for example, without limitation, utilizing the Digital Binary Star Challenge and Response BOT Detection systems, methods, components, elements, and associated architectures (collectively and interchangeably may be referenced herein as the Digital Binary Star Challenge and Response BOT Detection), as disclosed herein, that are modeled on characteristics displayed in an analog astrological system known as Binary (Twin) Stars, as they orbit around each other in a shared planet system, which in turn orbits around them. Typically, binary stars are two stars that are never simultaneously visible, rather the behavior of one (e.g. the light emitted) infers the existence of the other in a circumbinary planet system. A circumbinary planet, is a planet that orbits two stars instead of one, where the two stars orbit each other in a binary star system, while the planet typically orbits farther from the center of the system than either of the two stars.

In at least some embodiments, similarly the Digital Binary Star Challenge and Response BOT Detection is designed to infer the existence of one entity (BOTS) by the absence of a characteristically defining ability in another (a cellular ability to originate signals). In at least some embodiments, BOTS, entities that lack the cellular (i.e. phone) capability to signal and thus fail to respond to, for example, without limitation, the Star Random Challenge as disclosed herein, are thus inferred by HUMANS, beings that have cells (phones) and who can easily use cells (phones) that may emit cellular signals using the disclosed response to the challenge presented and thus are empirically detected.

As detailed herein, at least some embodiments of the present disclosure are directed to one or more technological solutions that are designed to address one or more of technological problems identified herein by, for example, without limitation, allowing for seamlessly and conclusively reverse detecting BOTS, as disclosed herein, economically at scale cannot be overstated. Once BOTS may be detected using this negative outcomes based on a "blind test" as disclosed herein, entire digital ecosystem(s) (e.g. the metaverse) and the information that is produced and consumed by their inhabitants, as data flows through it, may be reorganized and recalibrated, and may continue to operate as a largely self-regulated, autonomous ecosystem(s).

As detailed herein, at least some embodiments of the present disclosure are directed to one or more technological solutions that are designed so that, for example, without limitation, Authentic beings (humans) and their input may thus be clearly distinguished and distinctly presented from input created by artificial entities (i.e. automatons, BOTS) which may be malevolent in content and/or intent. For example, the Digital Binary Star Challenge and Response BOT Detection is predicated on getting the entire online user base to "call Twitter" (by proxy), to signal using their cellular phones up into the cloud, by challenging Twitter's base to dial highly randomized symbolic telephone numbers in order to reveal their true digital identity (e.g., their globally unique MSISDN). Thus, in at least some embodiments, the Digital Binary Star Challenge and Response BOT Detection is designed to identify and reveal the true nature and characteristics of online entities (e.g. "the user base"), and address the real practical, behavioral and technological challenges they present, serving to underscore the scope of the technological challenges being addressed by this present disclosure, such as, without limitation, amongst these being the ability to influence elections, followed closely by perpetrating fundamental economic inequities.

In at least some embodiments, for example, the Digital Binary Star Challenge and Response BOT Detection disclosed herein may now conclusively resolve various challenges presented by BOTS, click-farms and/or other malicious processes that seek to bypass human detection, since these BOTS and/or programs are typically executed remotely and/or virtually in the cloud, on the internet, using published APIs, etc., rather than executing locally on a physical computing device where the response requires access to cellular signaling functionality; consequently, BOTS and other various programs/processes lack the ability to mobile originate signals through an MNO and be authenticated as disclosed herein since they critically lack the presence of a registered SIM card with the requisite IMSI and security keys. Ironically, by analogy and in actuality, in the scope of this present disclosure and per the Digital Binary Star Challenge and Response BOT Detection, including various cellular challenge and response methods and systems disclosed herein, BOTS are thus literally and figuratively "entities who lack cells", that is "automatons who lack cellular signaling capability" and consequently, are incapable of recognizing and responding to the challenge presented as disclosed. Conversely, various technological solutions disclosed herein are predicated literally on "entities that do have cells", that is, human beings who have access to a cellular signaling device, and are capable of recognizing and responding to the challenge presented in accordance with various embodiments herein. Using TWITTER™ as an illustrative example, without limitation, the Star Challenge and Response methods, systems, components, and network architectures disclosed herein may now effectively segment/differentiate and/or partition/separate BOTS from the authentic human base.

For example, in at least some embodiments, presenting and on failing to pass a Star Random Challenge, by failing to respond from a cellular device in the disclosed signaling manner, an illustrative computer system of TWITTER™ may be programmed to then tag the account as unauthorized (non-human). In one non-limiting embodiment, the computer system of TWITTER™ may be programmed to then change a design schema for the unauthorized account, for example, from the current Blue style color theme to a Red (alert) theme (and/or make any other visual change(s) and segmentations as disclosed), and furthermore apply an appropriately colored (e.g. red) BOT visual "Badge" (i.e. visual schema) to the account profile and/or status. In some embodiments, all tweets posted from such unauthorized BOT account would then be instantly recognizable, for example, without limitation, both in color and/or in badge. In some embodiments, such exemplary market segmentation, the "separation of wheat from chaff", would further improve the technological operations of computer networks that may result in positive online social impact in crystalizing the metaverse, given that services would now have, for example, without limitation, a capability to authentically target and/or market products and/or services to their real authentic user base, excluding BOTS, since marketers may now have the option to elect to only target authentic (authenticated as detailed herein) users in their digital campaigns (e.g., digital automated computer recommendation engines). In at least some embodiments, for example, the Star Challenge Response methods, systems, components, and network architectures disclosed herein may, with the ability to segment the user base thus, be utilized to reshape and/or enhance the effectiveness of the digital advertising industry by permitting more granular/targeted campaigns directed to an authentic user base (e.g., online advertising, outdoor and/or indoor digital displays having social media capabilities, etc.). This enhanced advertising capability, to selectively target real human users while excluding BOTS, can both reduce Cost Per View (CPV) based advertising and increase the conversion and response rate, the ad-click through rate (CTR) since on such an accurately targeted and segmented campaign, overall less advertisements are being served to a more captive, real user facing audience.

In at least some embodiments, different BOT classes/categories or BOTS applied to certain subject matter/content domains (e.g. without limitation, BOTS applied to news feeds, marketing, health care, academia/research, non-profit organization; governmental agencies, etc.) may be further distinguished by applying, without limitation, distinct interface profiles or themes from a plurality of color schemas, as shown for example in the table of FIG. 5 (A Twitter™ Taxonomy).

The Table of FIG. 5 depicts a non-limiting Twitter Classification (Taxonomy), segmented using the disclosed systems and methods, and modeled on a broadcasting network covering a variety of channels.

In one non limiting embodiment, in reference to Twitter™, the aforementioned color schemas may be applied to the corporate logo as depicted in the Table of FIG. 5, for example presenting a suitably colored bird, and/or by applying similar coloring accents to messages and windows associated with a BOT detected and categorized account. In one non-limiting embodiment, such BOT schemas may be distinguished further by applying at least one ranking algorithm which may be programmed/configured to score each BOT based on one or more metrics, such as, without limitation, the number of links and/or citations (e.g. retweets) referencing a particular post or discussion thread, the number of hash (#) tag references, the number of "likes" and/or followers of real users authenticated using, for example, without limitation, the Star Random Challenge methods and systems disclosed herein etc.

For example, in one non limiting illustrative BOT ranked schema, a particular BOT's activity, collectively overall and/or discretely (e.g., an individual posting, a group of postings, etc.) may be ranked and rated, in one non-limiting embodiment, using a percentage confidence-based weighted average score, by measuring the inputs (e.g. "likes", retweets, hash-tags etc.) from users that have been authenticated as humans by the random challenge and response method and system disclosed, either numerically, as a percentage of the total postings in that category as a measuring scale, or graphically, where in some embodiments, the ranking is portrayed as an arc of a circle where a fully closed circle represents 100% and where a half moon circle represents 50%, a quarter moon represents 25%, etc. For example:

News/Orange/50%, indicating a 50% level of trust in a new channel reported by a BOT, rated by an algorithm that computes the percentage of authenticated users who have tagged, followed, retweeted, hash-tagged etc. the news channel, collectively on all news items, and discretely on individually reported events, and significantly, the algorithm excluding or distinctly indicating separately, any ratings/recommendations by BOTS, detected and tagged as such on failing to respond to the authentication challenge as disclosed herein;

Marketing/Green/90%, indicating a 90% level of confidence in recommending a service or product promoted by BOTS or actual humans, as rated by authenticated actual humans (users) and significantly, by excluding or distinctly indicating separately, any recommendations by BOTS, detected and tagged as such, on failing to respond to the authentication challenge as disclosed herein.

In some embodiments, such illustrative ranking-tagged schemas, where a higher score equals a greater confidence ranking, may permit viewers to instantly, at a glance, through color and percentages, gain insight into the reliability of source(s) and/or accuracy of the information posted (e.g. electronic submissions). In some embodiments, such illustrative ranking-tagged schema, where a higher score equals a greater confidence ranking, may permit viewers to instantly, at a glance, through color and percentages, gain insight into the reliability of link(s), citation(s), tweet(s) and/or retweet(s). In some embodiments, such illustrative ranking-tagged schema, where a higher score equals a greater confidence ranking, may permit viewers to instantly, at a glance, through color and percentages, gain insight into the credibility of real users following them. For example, users may be less inclined to follow a "Gray BOT" with low ranking, indicating a generic contributor over a wide subject domain with relatively few real user endorsements (i.e. retweets, up votes etc.), and more inclined to follow a "Colored BOT" with higher ranking, indicating a specialist with a dominant domain of expertise, has been determined either through artificial intelligence conducted on posted subject matter, or whose domain has programmatically selected a domain from a plurality of domains, that has a relatively high number of real user endorsements (i.e. retweets, up votes etc.)

In some embodiments, various online participation-related ranking schemas for identifying, differentiating, classifying, and/or ranking users, BOTs, and their associated activities, as disclosed herein, may allow more complex evaluation assessments that may not be binary (true or false) but instead may now be based on a fuzzy-logic that may be designed to facilitate the IAPP to display and/or represent degrees of truth based at least in part on, for example, the collective opinions of authenticated users (per the disclosed system and method) and from BOTs that are ranked by authenticated users, according to the metrics disclosed, or any combination thereof.

In at least some embodiments, when the Star Random Challenge is not successfully completed, for example, the Star Platform may return a failed/error indicator/identifier and/or nothing may be returned/received during a predetermined time period, identifying by the absence of a successful challenge/response, that an entity attempting to perform an action (e.g., access a restricted resource, login, post, retweet, etc.) may thus be deemed a BOT, and consequently, the IAPP may be programed to tag the account as a BOT and thereby change one or more visual characteristics of the IAPP and/or any content submitted and/or produced by the BOT to one of a plurality of schemas that may include without limitation, visual themes, sound-producing themes, vibration-inducing themes, or any combination thereof (e.g. color themes, content-related themes (e.g., domain themes (e.g., type of content), source themes), audience-related themes, etc.).

In at least some embodiments, when the Star Random Challenge is not successfully met, the IAPP may be programmed to execute one or more machine-learning techniques, including machine-learning models based on classifying and/or algorithmic ranking schema(s), to, without limitation, classify the BOT by assigning/associating a particular service category to/with the BOT. In some embodiments, the IAPP may classify BOTs based on a plurality of categories and/or classifications for selected activity or activity category (e.g., tweeting), and/or source(s)/entity(ies) associated with BOTS (e.g. a source (e.g. IP address) from where a BOT communicates) that may be classified into source categories based on one or more parameters. For example, the classification may be further determined by a subject domain of the IAPP (e.g., health, news, marketing, education, research, etc.) and/or one or more metadata characteristics of content published by the IAPP. In some embodiments, in addition to classifying the users, the BOTs, or both, the IAPP may further rank such as, without limitation:

BOT(1): News/Orange/50%,
BOT(2): News/Orange/70%.

In at least some embodiments, the exemplary machine-learning techniques, including machine-learning models, utilized herein, may be chosen from, but not limited to, decision trees, boosting, support-vector machines, neural networks, nearest neighbor algorithms, Naive Bayes, bagging, random forests, and the like. In some embodiments and, optionally, in combination of any embodiments described above or below, an exemplary neutral network technique of the present disclosure, for example, to classify and/or rank BOTS, may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network of the present disclosure may be executed as follows:

i) Define Neural Network architecture/model,
ii) Transfer the input data to the exemplary neural network model,
iii) Train the exemplary model incrementally,
iv) Determine the accuracy for a specific number of timesteps,
v) Apply the exemplary trained model to process the newly-received input data,
vi) Optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network utilized by the IAPP may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the exemplary trained neural network model may be trained based training data set(s) derived from historical and/or present activity data related to one or more activities performed within the IAPP, including one or more of: user profile data, including, without limitation, activity preferences, contextual information associated with the user profile data, activity tracking data, geographical identifier(s), Internet Service Provider's geographic location, type of activities, social impact factors, etc. In some embodiments, historical and/or present activity data may be activity data related to one or more activities performed by BOTs only (BOT activity data). In some embodiments, historical and/or present activity data may be activity data related to one or more activities performed by both BOTs and physical users (e.g., users who successfully completed the Start Random Challenge). In some embodiments, historical and/or present activity data may be activity data related to one or more activities performed by physical users only (e.g., users who successfully completed the Start Random Challenge).

In some embodiments, since various communications protocols and network architectures of the present disclosure such as, without limitation, an exemplary so-referenced herein "STARKEY" protocol, would be conducting communications entirely along the MO signaling path, they would overcome the need for networks to incur the resources required to, for example, without limitation, page and locate cellular devices, as may be typically required for various 2FA protocols, since the cellular device itself would now transmit rather than receive the authorizing codes and/or signals.

As detailed herein, at least some embodiments of the present disclosure are directed to one or more technological solutions that are designed to address one or more of technological problems identified herein by, for example, without limitation, utilizing a cellular HOOK FLASH signaling protocol that powers the MO authentication protocol, that may operate, without limitation, synonymous to a fixed line telephone going OFF HOOK (e.g. user lifting a phone receiver), and thereby immediately disclosing its location to at least one network element (e.g. the Central Office). For example, at least some embodiments of the present disclosure would utilize an exemplary Instant Symbol Originating Signaling functionality that would be initiated/activated by the users activating (e.g. pressing) at least one particular symbol on a telephony dial pad, herein also referenced as "Symbol Factor Authentication" (SFA), the ability to transmit a digital cellular symbolic signal as the authenticating factor. For example, in some embodiments the SFA would be based on users, activating (e.g. pressing) the symbol "*" ("Star Factor Authentication").

As detailed herein, at least some embodiments of the present disclosure are directed to one or more virtual technological solutions that are designed to address one or more of technological problems identified herein by, for example, without limitation, utilizing any phone without change (so-called "zero footprint" technology).

As detailed herein, at least some embodiments of the present disclosure are directed to one or more technological solutions that are designed to address one or more of technological problems identified herein by, for example, without limitation, operating in the mass dial signaling stream.

As detailed herein, at least some embodiments of the present disclosure are directed to one or more technological solutions that are designed to address one or more of technological problems identified herein by, for example, without limitation, delivering instant (flash) high frequency secure authentication at scale.

As detailed herein, at least some embodiments of the present disclosure are directed to one or more technological solutions that are designed to address one or more of technological problems identified herein by, for example, without limitation, operating anonymously without exposing any personal identifying data of a user.

As detailed herein, at least some embodiments of the present disclosure are directed to one or more technological solutions that are designed to address one or more of technological problems identified herein by, for example, without limitation, providing/delivering a universal digital master key for unlocking internet resources (e.g. online services).

As detailed herein, at least some embodiments of the present disclosure are directed to one or more technological solutions that are designed to address one or more of technological problems identified herein by, for example, without limitation, allowing a Mobile Network Operator (MNO) to charge for delivering/providing access controlling mechanisms of the present disclosure (e.g. authentication service, login service, verification service, dispensing service, etc.). In some embodiments, the MNO may, for example, charge a predetermined or variable amount (e.g. a penny) per unlocking activity (e.g. releasing transaction, unlocking online resource, one-time login, etc.), thus allowing MNO's to increase its capacity utilization and/or operational efficiency at high frequency and mass scale without impacting the MNO's telephony operations. In some embodiments, the MNO may charge by creating a session data record that may be presented to a user as an entry in the user's itemized cellular bill.

Illustrative Terminology as Utilized in at Least Some Embodiments Described Herein Table 1 provides full descriptions of abbreviations that may appear in the present disclosure.

TABLE 1

| | |
|---|---|
| 2FA | Two Factor Authentication |
| A-SBC | Access Session Border Controller |
| AAA | Authentication Authorization Accounting |
| ABMF | Account Balance Management Function |
| ACH | Apply Charging |
| ACK | Acknowledgment |
| ACM | Address Complete Message |
| ACR | Apply Charging Report |
| ANS | Answer |
| API | Application Programming Interface |
| APP | Application Program |
| AS | Application Server |
| B2BUA | Back To Back User Agent |
| BCD | Binary Coded Decimal |
| BGCF | Border Gateway Control Function |
| BHCA | Busy Hour Call Attempts |
| CAMEL | Customized Applications for Mobile network Enhanced Logic |
| CCA | Credit Control Answer |
| CCR | Credit Control Request |
| CDMA | Code Division Multiple Access |
| CDPA | Called Party Address |
| CDPN | Called Party Number |
| CDR | Call Data Record |
| CDRS | Call Data Records |
| CGPN | Calling Party Number |
| CHF | Cryptographic Hash Function |
| CHT | Call Hold Time |
| CLI | Calling Line Identity |
| CLIP | Calling Line Identity Presentation |
| CLIR | Calling Line Identity Restriction |
| CPG | Call Progress |
| CSCF | Call Server Control Function |
| CSE | CAMEL Service Environment |
| CSI | CAMEL Subscription Information |
| CSS | Cascading Style Sheets |
| CTF | Charging Triggering Function |
| DCB | Direct Carrier Billing |
| DNS | Domain Name System |
| DOM | Document Object Model |
| DP | Detection Point |
| DP2 | Detection Point 2 |
| EDP-R | Event Detection Point Request |
| ESD | Exceptional Service Delivery |
| ESME | External Short Message Entity |
| ETSI | European Telecommunications Standards Institute |
| FLASH | Momentary Connect and Disconnect |
| FQDN | Fully Qualified Domain Name |
| GMSC | Gateway MSC |
| GPRS | General Packet Radio Service |
| GSM | Global System for Mobile Communications |
| GSMSCF | GSM Service Control Function |
| GSMSRF | GSM Special Resource Function |
| GSMSSF | GSM Service Switching Function |
| GSMSSG | GSM Service Selection Gateway |
| GUID | Globally Unique Identifier |
| HLR | Home Location Register |
| HSS | Home Subscriber Server |
| HTML | Hyper Text Markup Language |
| HTTP | Hyper Text Transfer Protocol |

TABLE 1-continued

| | |
|---|---|
| I-CSCF | Interrogating Call Session Control Function |
| IAM | Initial Address Message |
| IAPP | Internet Application Program/Internet Enabled Application Program |
| ICCID | Integrated Circuit Card Identification Number |
| ICDR | Internet Content Data Record |
| ICSI | IMS Communication Service Identifier |
| IFC | Initial Filter Criteria |
| IMEI | International Mobile Equipment Identity |
| IMS | Internet Multimedia Subsystem |
| IMS-AGW | IMS Access Gateway |
| IMS-ALG | IMS Application Level Gateway |
| IMSI | International Mobile Subscriber Identity |
| IN | Intelligent Networking/Intelligent Network |
| INAP | Intelligent Network Application Protocol |
| INITDP | Initial Detection Point |
| IO | Internet Originated |
| IP | Internet Protocol |
| IPE | IP Endpoint |
| ISDN | Integrated Services Digital Network |
| ISUP | ISDN User Part |
| IVR | Interactive Voice Response |
| JSON | JavaScript Object Notation |
| LTE | Long Term Evolution |
| LTU | License To Use |
| MAP | Mobile Application Part |
| MCC | Mobile Country Code |
| MGCF | Media Gateway Control Function |
| MMS | Multimedia Messaging Service |
| MNC | Mobile Network Code |
| MNO | Mobile Network Operator |
| MO | Mobile Originating |
| MOD | Modulus |
| MPBN | Mobile Packet Backbone Network |
| MRF | Media Resource Function |
| MS | Mobile Station |
| MSC | Mobile Switching Center |
| MSISDN | Mobile Subscriber ISDN |
| MSRN | Mobile Station Roaming Number |
| MT | Mobile Terminating |
| MVNO | Mobile Virtual Network Operator |
| NIST | National Institute of Standards and Technology |
| O-CSI | Originating Camel Subscription Information |
| OBCSM | Originating Basic Call State Model |
| OCS | Online Charging System |
| OFFHOOK | Lifting Receiver/Answering a call (Connect) |
| ONHOOK | Replacing Receiver/Hanging up a call (Disconnect) |
| OI | Originating Identification |
| OOB | Out of Band |
| OSS | Operator Specific Service |
| P-CSCF | Proxy Call Session Control Function |
| P2P | Peer To Peer |
| PCC | Policy and Charging Control |
| PCEF | Policy and Charging Enforcement Function |
| PCO | Protocol Configuration Options |
| PCRF | Policy Charging and Rules Function |
| PDD | Post Dial Delay |
| PI | Personal Identification |
| PIC | Point in Call |
| PING | Signaling Caller Identity |
| PPV | Pay Per View |
| PSMS | Premium SMS |
| PSTN | Public Switched Telephony Network |
| QR | Quick Response (Code) |
| R-URI | Request URI |
| RAN | Radio Access Network |
| RBT | Ring-back-tone |
| RCS | Rich Communication Services |
| REL | Release |
| RF | Rating Function |
| RLC | Release Complete |
| ROI | Return On Investment |
| RRBE | Request Report BCSM Event |
| RTP | Realtime Transport Protocol |
| S-CSCF | Serving Call Session Control Function |
| SBC | Session Border Controller |
| SBCF | Session Balance Control Function |
| SBMF | Session Balance Management Function |
| SCP | Service Control Point |
| SFA | Symbol Factor Authentication/Star Factor Authentication |
| SIM | Subscriber Identification Module |

TABLE 1-continued

| | |
|---|---|
| SIP | Session Initiation Protocol |
| SK | Service Key |
| SKU | Stock Keeping Unit |
| SLPI | Service Logic Program Instance |
| SMPP | Short Message Peer to Peer |
| SMS | Short Message Service |
| SMSC | Short Message Service Center |
| SRF | Specialized Resource Function |
| SS7 | Signaling System Seven |
| SSU | Single Service Unit |
| STP | Service Trigger Points |
| TAS | Telephony Application Server |
| TDMA | Time Division Multiple Access |
| TDP | Trigger Detection Point |
| TDP-N | Trigger Detection Point Notify |
| TDP-R | Trigger Detection Point Request |
| TMSI | Temporary IMSI |
| TTL | Time To Live |
| UMTS | Universal Mobile Communications System |
| UNAP | User Name And Password |
| URI | Uniform Resource Identifier |
| URL | Uniform Resource Locator |
| USP | Unique Service Proposition |
| USSD | Unstructured Supplementary Services Data |
| UUID | Universally Unique Identifier |
| VLR | Visitor Location Register |
| VOCS | Virtual Coin Operating System |
| VOIP | Voice Over Internet Protocol |
| VOLTE | Voice Over LTE |
| WINK | Short Duration OFFHOOK Signal |
| WWW | World Wide Web |
| XMSISDN | Cryptographically Hashed MSISDN |
| XMSISDN4 | XMSISDN Ending With Last 4 MSISDN Digits Appended |

In at least some embodiments described herein, the terms "mobile", "cellular", "cell", "phone," are used interchangeably to describe a modern GSM/TDMA/CDMA/UMTS/IP digital wireless telephony and a communications network. While illustrations may depict a smartphone, any phone may be applicable, including without limitation, a basic feature phone, an IP phone, a VOIP phone. Statements such as "the mobile device" may be interchangeable with "the user of the mobile device". In at least some embodiments described herein, while networking elements may be referenced in the singular, they may incorporate elements in the plural. In at least some embodiments described herein, network subsystems (e.g. Billing Systems) may incorporate elements from other subsystems (e.g. IN Control Systems).

In at least some embodiments described herein, the terms "communications signal(s)", "communication signal(s)," "mobile communications signal(s)," "mobile communication signal(s)," "cellular communications signal(s)," "cellular communication signal(s)," "cellular signal(s)," and the like are used interchangeably and describe, without limitation, digital signals, data and/or digital data packet(s) that may be encoded, partially or in full, (e.g. without limitations, bit/byte/hexadecimal/binary coded decimal etc. format) for (1) cellular transmission utilizing radio wave frequencies and associated elements(s)/device(s) programmed to operate in accordance with one or more suitable cellular transmission protocols, (2) for transmission in conjunction with one or more wireless Internet-related protocols and correspondingly programmed device(s)/element(s), or (3) any combination of any embodiment of (1) and any embodiment of (2).

In at least some embodiments described herein, the term "element(s)" and the like may describe programmed computing device(s) executing at least a portion of software program(s) resided, partially or in full, in one or more non-transient computer memory blocks (e.g. without limitations, Flash Memory, RAM, ROM, etc.), software program(s), or a combination thereof.

In at least some embodiments described herein, the terms "cellular network", "mobile networks," "cellular telephony network," "mobile telephony network," "cellular mobile network(s)", "cellular communications network" and the like are used interchangeably.

In at least some embodiments, the character "X" in conjunction with other "X" characters, referenced herein, may represent a series of randomized decimal digits (0-9) to be utilized as detailed herein (e.g. the STAR challenge). For example, the series of "XXX XXX XXX" represents a randomized number describing 10^9 (billion) permutations (e.g. a billion challenges). For example, the series "XXX XXX XXX XXX" represents a randomized number describing 10^12 (trillion) permutations (e.g. a trillion challenges). For example, the series "XXX XXX XXX XXX XXX" represents a randomized number describing 10^15 (quadrillion) permutations (e.g. a quadrillion challenges).

In some embodiments, the illustrative STAR challenge may be symbolically prefixed. In some embodiments, without limitation, this prefix may be a Star (*), Double Star (**), Hash(#), Double Hash (##), Star Hash (* #), Hash Star (#*) or any other symbol or combination of symbols. In some embodiments, (e.g. a single Star (*)) such a symbolic prefix would shift the address signals one position to the right, escaping thus the regular dialed address domain into a previously unutilized symbol/number realm (e.g. star number realm, when utilizing the symbol "*").

In some embodiments, the character "Y" in conjunction with other "Y" characters, referenced herein, may represent a telephone number having a series of digits such as decimal digits (0-9). For example, the series of "+Y YYY YYY YYYY" may represent a typical e164 formatted MSISDN (e.g. 11 digits, with + as the outbound international dialing symbol). Note, while numbers may be presented with spaces for visual acuity, numbers are typically dialed without spaces. The MSISDN may be transported and presented as the Calling Line Identity (CLI).

At least in some embodiments, the term "caller(s)", and like, is interchangeable with the "A" party. The party is interchangeable with the associated telephony device (telephone). Embodiments may show the callers as "A", "B", "C" etc., to distinguish between different callers.

At least in some embodiments, the term "IP Application" (IAPP) and like, as referenced herein, may describe an internet connected application, including, without limitation, an internet browser and/or a native mobile application. At least in some embodiments, the terms "pairing", "coupling", and alike describes either transiently or persistently logically associating an identity (e.g. a cellular identity (e.g. MSISDN, hashed XMSISDN, etc.) with an IAPP. At least in some embodiments, pairing may be accomplished by storing, for example, an identity (e.g. a cellular identity (e.g. MSISDN), a globally unique identity (GUID) derived from the cellular identity (e.g. XMSISDN), etc.) in at least one of: application memory and/or variables, non-transient memory, database, cache, browser application context using storage components such as persistent cookies, cached URL parameters, etc. At least in some embodiments, the identity may be stored/kept local to a domain or may be global (e.g. cloud-based) in context, permitting cross domain reference.

At least in some embodiments, the identity may be written into a blockchain-type distributed storage. In some embodiments, the STAR Platform and/or the IAPP may be configured to interact and/or to store data in one or more, public, private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

At least in some embodiments, once paired thus, the illustrative IAPP may make reference to the associated identity (e.g. cellular identity) in future activities (e.g. processing transactions, accessing access-restricted resources, etc.) so that the exemplary STARKEY Platform would be programmed to expect (anticipate) signals from the paired device and thus, for example, without limitation, previously identified cellular device being associated to at least the expected access control digital key.

For example, at least in some embodiments, utilizing the disclosed expectation authentication mechanism may permit a MANY:ONE (Many-to-One) binding relationship, where many cellular devices may emit the one and same access control digital key (e.g. telephone calls having the same address signals) and yet still be uniquely identified and bound to, without limitation, an IAPP, an online accessed-restricted resource provider, etc., since the access controlling platform is set to monitor for incoming signals (e.g. phone calls, SMS messages, USSD messages) from the paired and thus uniquely associated and identified identity (e.g. MSISDN) matching an access authentication expectation record set for the paired identity, including thus identity data and common same access control digital key, which is logically associated to the access restricted resource for the paired identity.

In at least some embodiments, the IAPP and/or the internet service requesting Star Challenge login to a restricted resource, as detailed herein, would logically associate the currently active and pending login session with the anticipated authorization confirmation to be received from the access controlling platform (e.g., the STARKEY Platform), once the access controlling platform confirms receipt of the static signal(s) from the expected paired identity, specified by the IAPP as a parameter in an access controlling API. For example, without limitation, the illustrative IAPP may create a unique Star login session identifier "SL-X" and, utilizing the Star API, request Star Login access for the previously identified device ID MSISDN-A, XMSISDN-A or XMSISDN-A4.

In at least some embodiments, upon receiving a static star signal from a device identified as MSISDN-A, whose CGH equals XMSISDN-A, the access controlling platform may then communicate successful Star Login by device XMSISDN-A, which the IAPP has associated with login session SL-X, thereby uniquely and securely granting access to the restricted resource being requested and safeguarded by the Star login procedure. In at least some embodiments, an IAPP that has previously been paired with a known cellular identity (e.g. XM4), as described herein (e.g. Star Random Challenge Response), may request the access controlling platform to notify the IAPP, for example utilizing a callback URL, when static signal(s) is/are received from a cellular device whose hashed MSISDN matches XM4. Thus receiving an authentication confirmation that the cellular device whose identity matches the identity paired with the IAPP, is analogous to the device unlocking the restricted device with its unique digital signature ("Star Key").

As detailed herein, at least some embodiments of the present disclosure are directed to one or more technological solutions that are designed to address one or more of technological problems identified herein by, for example, without limitation, presenting thus, a randomized, and optionally extended, telephone number to call that would uniquely bind the challenge (e.g. the STAR challenge) and the responding cellular device to an IAPP, an online accessed-restricted resource provider, or similar others, based on utilizing a trusted network (e.g. a cellular network) to provide an identity (e.g. MSISDN) associated with the device that emits the matching response. In at least some embodiments, for example, without limitation, the cellular identity (e.g. MSISDN) would be an end user network presentation that would be provided by the cellular network based on a more intrinsic identity called the International Mobile Subscriber Identity (IMSI), which may be stored on the Subscriber Identification Module (SIM) embedded/included in every cellular phone. For example, the Home Location Register (HLR) or Home Subscriber System (HSS) may store a mapping between IMSI and MSISDN. In some embodiments, a Temporary Mobile Subscriber Identities (TMSI) may be allocated to mobile subscriber equipment (i.e. cellular phone) in order to support subscriber identity confidentiality. The TMSI is mapped to the IMSI internally within the MNO, so only the mobile equipment and the MNO knows the mapping. By utilizing a TMSI, the network minimizes IMSI exposure over the air interface. As detailed herein, at least some embodiments of the present disclosure are directed to one or more technological solutions that are designed to address one or more of technological problems identified herein by, for example, without limitation, relying on the trusted cellular network that, rather than the user or the device, would control and present a Calling Line Identity (CLI), as in:

Source Phone [IMSI/TMSI]>Network [TMSI/IMSI: MSISDN]>Destination Platform [CLI].

As detailed herein, by signaling (e.g. address signaling) in accordance with various embodiments of the present disclosure, each user would be individually and digitally signing a cellular certificate (CDR), authenticating access to an access-restricted resource (e.g. internet service, electronic game console-based offering (e.g. skin, avatar, game pass, etc.), an item from a physical vending machine, ATM-based transaction, etc.). Accordingly, in at least some embodiments, utilizing various disclosed methods, systems, network architectures, and communications protocols would deliver the digital equivalent of a virtual master key (e.g. a virtual cellular master key), also interchangeably referenced herein, without limitation, as a "STARKEY" that would be utilized to unlock various resources (e.g. digital services, digital products, physical services, physical products, etc.).

In some embodiments, by shifting the dialed subscriber domain on a symbolic prefix (e.g. STAR (*) symbol), various disclosed methods, systems, network architectures, and communications protocols would shift the entire known dial address space one digit to the right, encapsulating a hitherto unutilized dial domain for signaling and/or switching advanced user services. For example, without limitation, the STAR (*) symbol may be utilized as the universal key on the telephone dial, and, as interchangeably referenced herein, be a symbolic network routing prefix and the name given to a network signaling and switching node that may service and control one of more elements of various systems and/or network architectures disclosed herein, and also may be interchangeably referenced herein, without limitation, as illustrative STARKEY systems, network architectures, and/or elements. In some embodiments, while, for example, without limitation, the illustrative STAR Platform is depicted as a SIP signaling system/server/network architecture, the illustrative STAR Platform and variations and extensions thereof that would be reasonably foreseen based on one or more principles detailed in the present disclosure (even if not specially detailed herein). In at least some embodiments, various access controlling network architectures, interchangeably may be referenced herein also as STAR architectures, are detailed herein for illustrative purposes only and other signaling systems, network architectures, elements, and/or communications protocols (e.g. without limitation, SS7, ISUP) may be similarly designed, adopted, and/or modified in accordance with one or more principles described herein to achieve one or more same or suitably similar practical, technological improvements.

In some embodiments, for example, without limitation, the illustrative IAPP programmed in accordance with one or more principles of the present disclosure would operate/function as a so-called "virtual/digital Automated Teller Machine" ("V-ATM"), by permitting users to wirelessly, without contact, authenticate and pair their computing device (e.g. cellphones) with an interactive cardless (e.g. Virtual VISA) session for cash withdrawals from an MSISDN-linked bank account. For example, without limitation, to authenticate such cash withdrawal, in accordance with one or more principals disclosed herein, various disclosed methods, systems, elements, network architectures, and/or communications protocols would be programmed to utilize the described identity (e.g. the cellular identity) as an internal banking identity and/or a proxy to the internal banking identity to deliver seamless interworking between various involved systems, where:

The Cell Phone Number [MSISDN]=The Bank Account Number [MSISDN].

In some embodiments, without limitation, the MSISDN may be set as a primary bank account number. In some embodiments, the MSISDN may be utilized as a proxy, aliased to the primary (internal) account number of, for example, a financial institution/service provider (e.g. bank, brokerage, credit card issuer, etc.), a utility company (e.g. cable, gas utility, electrical utility, etc.). In some embodiments, for example, without limitation, a computer system of a financial service provider may be programmed to automatically create the MSISDN-numbered and/or linked/associated bank account (e.g. electronic/digital wallet) upon receiving funds designated to the said MSISDN, even when such MSISDN numbered and/or linked/associated bank account would not yet exist. In some embodiments, without limitation, since the recordation of money may be performed via entry(ies) recorded in a database (e.g., session data record), the MSISDN based identities (e.g. MSISDN based financial identity, MSISDN based utility identity, MSISDN based government agency identity, etc.) and their management (e.g. financial account management, etc.) would be readily realized based on one or more principles disclosed herein.

In some embodiments, based on one or more principles disclosed herein, the exemplary Mobile Network Operator (MNO) may be utilized/modified to become/perform as, for example, without limitation, as a Virtual Bank, permitting users to receive and sends funds directly into and from their Cellular Wallets (e.g. cellular accounts with the MNO). In some embodiments, based on one or more principles disclosed herein, the exemplary MNO may maintain a MNO-based ledger (e.g. MNO Billing System) and/or, utilizing one or more distributed ledger/blockchain technologies (e.g. Ethereum-based technology, Hyperledger Fabric™ (IBM), etc.) that may be configured to interoperate with computer systems of financial institutions (e.g. banks) to permit cash redemption at ATMs of participating ATM networks as disclosed herein.

In some embodiments, based on one or more principles disclosed herein, such as, without limitation, various disclosed cellular signaling methods and systems together with the unified cellular account number management, financial institutions (e.g. banks) can onboard the unbanked masses virtually, without having to issue physical debit/credit cards. For example, users may then bank and transact on their cellular identities (e.g. MSISDN numbers) to wirelessly receive funds into their cellular identified bank accounts (e.g. cellular account e-Wallets) from others (e.g. the economically empowered), and then wirelessly withdraw cash by pairing their cellular devices with ATM sessions, using, for example, without limitation, the Star Challenge (e.g. displaying the series of randomized digits or QR code encapsulating the series of random digits or the series of random digits prefixed with symbol(s)), as disclosed herein.

In some embodiments, based on one or more principles disclosed herein, on a first time STAR Challenge, an exemplary ATM may be programmed, without limitation, to request the user to enter a banking PIN using the ATM terminal to secure access, once the Star Random Challenge has been met. Thus, in at least some embodiments, while an exemplary cellular network would be utilized to identity a user facing the ATM by presenting the STAR Challenge, an associated financial (e.g. banking) network would secure access to funds by requiring the user to enter and record a secret PIN for future withdrawals at the ATM terminal on first time access. In some embodiments, based on one or more principles disclosed herein, neither the cellular nor the ATM network would be in total control of access, thus neither may individually gain full and compromised access. In some embodiment, the ATM-associated STAR Challenge may be presented as a telephone number to dial, and/or as a telephony QR code to scan, permitting the user to scan and automatically address the connection (e.g. the QR code would encapsulate the random series of digits that on scanning would be automatically entered into the user's phone as the number to dial), rather than requiring the user to manually input and dial the random series of digits.

In some embodiments, based on one or more principles disclosed herein, without limitation, users may activate an IAPP's STAR Challenge button and/or a link encapsulating a "tel:" reference, which may similarly link to and present a native device dialer preaddressed with the randomized STAR Challenge digits. For example, without limitation, a user interface element associated with the STAR Challenge may encapsulate the following or similar HTML reference:

<a href="tel:*XXX XXX XXX>:*XXX XXX XXX</a>.

In some embodiments, based on one or more principles disclosed herein, the illustrative STARKEY platform/system/architecture may be programmed to operate in accordance, without limitation, to the following illustrative non-limiting end user signaling protocol of the present disclosure upon dialing the STAR Challenge:

(1) Instantly Play a Ring Back Tone (RBT); and
(2) Momentarily Connect and Disconnect the Call.

For example, without limitation, by instantly presenting RBT, the above illustrated protocol of the present disclosure would ensure a short responsive, Post Dial Delay (PDD) experience. In at least some embodiments, by momentarily connecting and then disconnecting the call, a technique herein referenced as so-called "HOOK FLASHING," the illustrative STARKEY platform/system/architecture would be programmed to, for example, without limitation, uniquely generate, and/or caused to generate by the MNO, an early Call Data Record (CDR), may also be interchangeably referenced herein as a session data record, on the originating network (e.g. mobile originating network), instantly recording the authentication transaction and seamlessly transporting the recorded cellular certificate into, for example, the cloud for internet reference as described herein. For example, in accordance with the above illustrative non-limiting end user signaling protocol of the present disclosure, the entire STARKEY transaction would be typically completed in just one second or less to deliver a FLASH user engagement. For example, in some embodiments, one or more technological solutions of the present disclosure may be referenced as "FLASH Authentication." In some embodiments, in accordance with the technological solutions of the present disclosure, the resulting event record (e.g. the cellular billing ticket, also may be reference herein as the CDR (Call Data Record) or session data record), contains the Star signaling event (e.g. generated upon the user's cellular device emitting the address signal(s) upon activation of a "*" button). In some embodiments, in accordance with the technological solutions of the present disclosure, the PDD experience may last 1 second or less (e.g. from 1 millisecond to 1 second). In some embodiments, in accordance with the technological solutions of the present disclosure, the PDD experience may last 500 milliseconds or less (e.g. from 1 millisecond to 500 milliseconds). In some embodiments, in accordance with the technological solutions of the present disclosure, the PDD experience may last 100 milliseconds or less (e.g. from 1 millisecond to 100 milliseconds). In some embodiments, in accordance with the technological solutions of the present disclosure, the PDD experience may last 50 milliseconds or less (e.g. from 1 millisecond to 50 milliseconds). In some embodiments, in accordance with the technological solutions of the present disclosure, the PDD experience may last 1 millisecond or more. In some embodiments, the PDD may be eliminated entirely by forgoing to present a RBT.

In some embodiments, all star (*)-prefixed STAR Challenges may present as having a fixed length number (e.g. comprising 9, 12, 15 digits, etc.), that may be uniformly rated, for example, at 1 penny per transaction that may be referenced as "STAR AUTHENTICATION TOLL." For example, without limitation, the STAR AUTHENTICATION TOLL model, and associated access controlling network architectures may be operated by matching all fixed length symbol-prefixed (e.g. star (*)-prefixed) dialed numbers in an Online Charging System rating engine, which may uniformly apply the associated charge for switching the disclosed STARKEY-based transaction. In one embodiment the OCS sets a tariff switching interval to a minute rather than a second refresh interval, for example, by setting the tariffSwitchingInterval parameter in the AChBillingChargingCharacteristics function (per the ETSI TS 129 078 V12.0.0 (2014 October) specification) equal to an integer value 60, in one non limiting example, thereby ensuring that STAR Authentication Toll applied to transactions are debited discretely, rather than repeatedly during a single transaction. For example, in one embodiment, a STAR Challenge response may result in a Call Hold Time (CHT) exceeding one second, however on utilizing a minute-based tariff switching interval, the account associated with the cellular device may only be charged once, to ensure a fixed service toll/fee would be levied.

In at least some embodiments, the disclosed Star Random Challenge and Response methods, systems, components, and network architectures disclosed herein may be applied to existing online services and applications to authenticate existing and newly registering users. In one non limiting example, the IAPP may present a Star Random Challenge requesting users to verify their account. In at least some embodiments, since the Star Challenge may be predicated on a user (a person) manually activating the dial button to raise a call setup request to transport the encapsulated the series of randomly generated address signals over the air toward the access controlling platform, and given that automated processes, such as BOTS and/or other nefarious actors and/or malicious code, cannot automatically activate such a dial request (e.g. pressing the connect call button under programmatic control), such automated processes may be automatically excluded from completing, for example, the Star Random Challenge. In at least some embodiments, since a telephone call may be precluded from being conducted in the background, that is behind the currently visible application screen(s), and thus out of sight from unsuspecting users, the Star Challenge Response necessitates that a user is actively engaged in the authentication process for the Star Challenge Response to be completed and thereby the Star Challenge Response succeeds in determining that the account is an authentic, genuine user account.

[FIG. 1A]

FIG. 1A is an illustrative non-restrictive example of a binary bot detection process by inference based at least in part on cellular communication signals in accordance with at least some embodiments of the present disclosure.

At step 100, in at least some embodiments, the illustrative access controlling platform presents a Star Random Challenge to an IAPP that is required to be authenticated. The random challenge is displayed to the user by the IAPP, and the access controlling platform records an expectation data record ([?:RAN]) per the steps enumerated in FIG. 4.

At step 110, the access controlling platform sets and initiates a countdown timer (T), set to an interval of time sufficient to enable a user to respond to the challenge presented. In some embodiments, the timer may be set to less than one minute. In some embodiments, the timer may be set to greater than one minute. Various network factors, including without limitation, IAPP home country, current traffic density, number of pending authentication challenges, busy hours, latency etc., may determine the optimum timer interval to be set. In some embodiments, the access controlling platform may be programmed/configured to actively monitor incoming network traffic (e.g. SIP INVITES) transporting cellular signals from MNOs.

At step 120, on receiving a SIP INVITE, the access controlling platform extracts the address signals from the SIP INVITE Headers (e.g. SIP URI, SIP From: headers etc.) and queries the expectation data records to determine whether an valid and active RAN challenge exists that matches the signals detected and extracted from the incoming call. A valid RAN is a challenge that is expected. When an active RAN is a challenge whose timer T has not been exhausted (e.g. T=0 sec). When a RAN match is successful, then logic flows to step 130. When no RAN signals (SIP INVITES transporting the expected cellular signals) has been received and timer T has expired (T=0) then logic flows through step 140 to step 150.

While the flow sequence depicts the Timer being explicitly checked (polled), in some embodiments, timers may automatically trigger events on expiring, that is they can push notifications rather requiring them to be pulled/polled (e.g. event driven timers). In some embodiments, database may store actively monitor records with TTL (Time To Live) attribute(s) and execute predefined call-back(s) to appropriate functions for processing. In some embodiments, the timer T value may be communicated to the IAPP as a parameter set on activating the Challenge Request user interface element, and the countdown may then execute locally on the IAPP device. In some embodiments, on exhausting the Timer (i.e. T=0 sec) the IAPP is self-aware that a response to the challenge failed.

At step 130, on the affirmative YES branch the access controlling platform has empirically detected a human presence operating the IAPP, since per the disclosed Challenge Response Signaling, a human is required to interact with the IAPP in order to transmit the expected and anticipated cellular signals, by confirming the initiation of a call to the randomized telephone number. Thus the access controlling platform may set a verification attribute of the IAPP, by centrally recording an association between the IAPP, and in one embodiment, an identity associated with the cellular device (e.g. MSISDN and/or ICCID etc.) provided by the trusted MNO, and/or in an alternate embodiment the access controlling platform may record a cryptographically hashed associated cellular identity to safeguard user privacy. On successfully detecting a human operator thus, the access controlling platform may communicate to the IAPP that a successful authorization/verification response has been received, permitting the IAPP to gain authentic verified status. In some embodiments, the data transported to the IAPP in successfully responding to the random challenge is described in more detail herein. In one embodiment, the access controlling platform may transmit the hashed identity for local storage in the IAPP itself or on the cellular device to be utilized in subsequent star challenges as disclosed herein (e.g. requesting static cellular signals from a previously authenticated device).

At step 140, the access controlling platform may check of the timer T has expired.

At step 150, on detecting that a RAN timer associated with a pending (unfulfilled) challenge has expired (step 140), the access controlling platform may thus by inference make the determination that the IAPP is being operated by a BOT, since the response requires the initiation of a cellular communication transporting the random address signals, and such a cellular response requires manual user intervention and activation. On making the inferred determination on the negative outcome of the Challenge Response, the access controlling platform may then record and/or categorize the IAPP as being a BOT. In some embodiments the default status of all IAPPS registered or registering with the online service provider is set to BOT, and only upgraded to HUMAN on recording a successful challenge and response event.

[FIG. 1B]

Figure 1B:
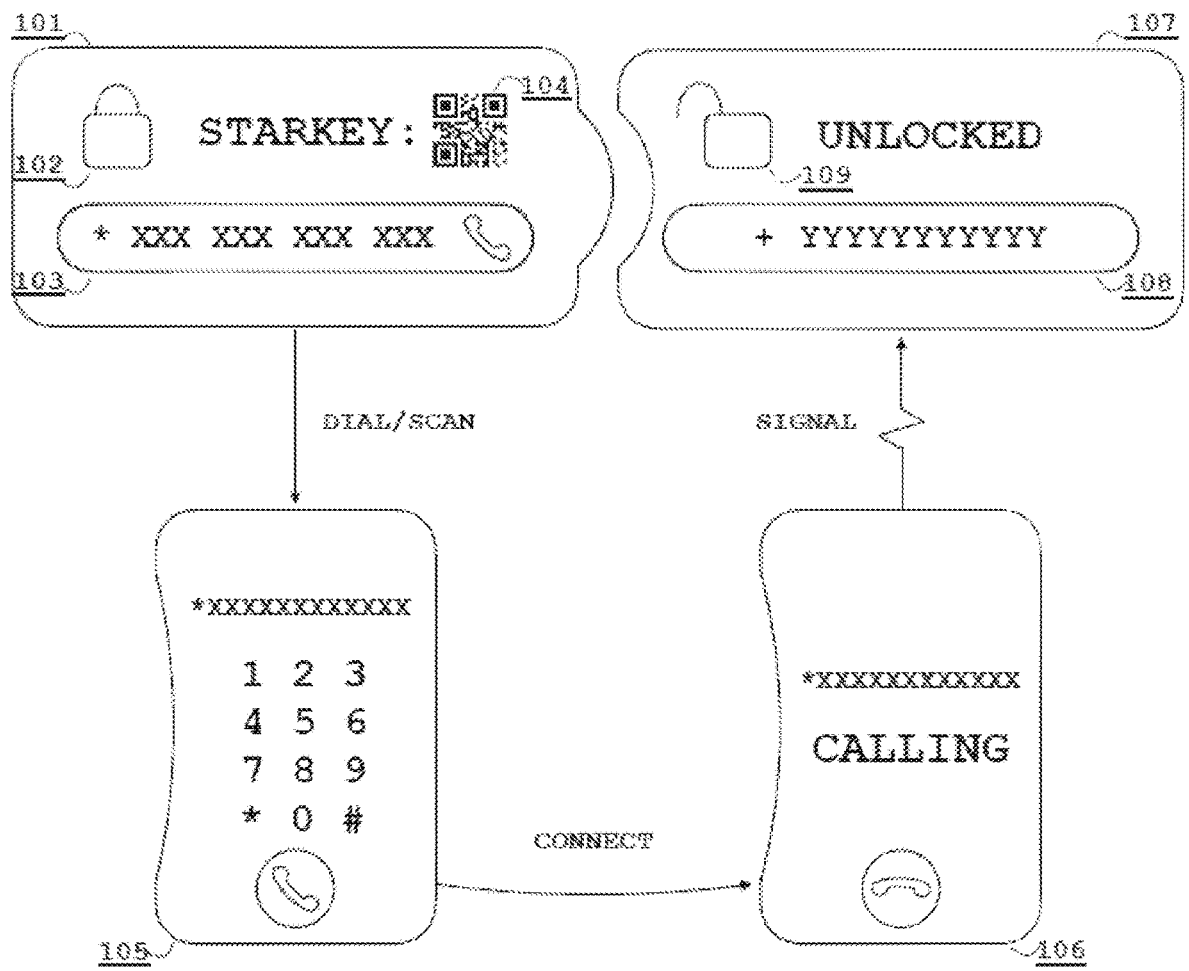
FIG. 1B is an illustrative non-restrictive example of access controlling network architecture(s) utilizing a cellular-signaled access control methodology with expected digital key(s) in accordance with novel communications protocol(s) of at least some embodiments of the present disclosure.

FIG. 1B is an illustrative non-restrictive example of utilizing a cellular-signaled access control methodology with expected random-generated cryptographic key(s)/challenge(s) in accordance with novel communications protocols and access controlling network architectures of at least some embodiments of the present disclosure. In some embodiments, based on one or more principles disclosed herein, an exemplary IAPP on an Internet-enabled computing device 101 is instructed to display a "STARKEY" locked screen requiring user identification for accessing at least one access-restricted digital resource. In some embodiments, the IAPP may be instructed/programmed to present an access controller interface element (e.g. lock icon) 102 to indicate that access is currently restricted. In at least some embodiments, the IAPP may be instructed/programmed via an API, to also present a randomized series of telephone digits (e.g. an access control component of the STAR Challenge, the expected access control digital key) in a user interface element 103, that would have been provided, for example, without limitation, by the illustrative STAR Platform (not shown).

In at least some embodiments, the API requests a user interface element (103) that is rendered by the IAPP to display the Star Challenge, for example in a button. In one embodiment the user interface element is described by, for example, without limitation, an HTML and or CSS script that is received and rendered by the IAPP. As described above, the user interface element may further incorporate, for example, programming instructions setting an "href=tel:" reference link (also known as a "click to call" button/link), that on activation launches and presents a native dialer APP (e.g. the telephone application) on a cellular enabled device, that has the series of random digits returned by the access controlling platform, automatically pre-addressed for dialing. In one non-limiting embodiment, programming instruction may render the user interface element (e.g. link or button) to display a prompt for the user to activate the user interface element to authenticate the device or request access to a restricted online resource (e.g. without limitation, a button or a link labelled "Star Login", or "Star Sign in", or "Star Auth", etc.).

On activating a user interface element that prompts the user thus, rather than displaying the actual Star Random Challenge itself, the interface element may, as described above, utilize a reference link (e.g. a click-to-call link) to launch the native dialer on a cellular device, which has the Star Challenge, the series of random digits, automatically pre-addressed and ready to dial.

In some non-limiting embodiments, the Star Challenge request may return, via the API, the random series of digits or programming instruction to render an interface element (e.g. HTML/CSS button, link, etc.) that may either encapsulate or may display the series of randomized digits or an interface element, wherein the former rendition only displays the random series of digits upon activation, and whereupon activation the series of digits would be automatically entered (i.e. pre-addressed) in the native dialer application as described. By returning programming instruction to render a user interface element, the Star Challenge API may thus present stylized instruction to render a consistently branded Star Challenge user interface (e.g. button shape, size, color, display text font and size, button animation effects etc.) instantly recognizable across a plurality of IAPPS.

Further, in at least some embodiments, the user would be requested to dial the entire STAR Challenge 103 from a cellular phone, which may for example, without limitation, be indicated by a phone icon (as displayed, at right).

In some embodiments, based on one or more principles disclosed herein, the STARKEY Platform may be programmed to utilize a random engine generator (e.g., a random number generator application and/or any other suitable technique to generate a series of randomly generated digits (e.g. an access control component of the STAR Challenge, the expected access control digital key) 103 and then return it to the IAPP utilizing a STARKEY API, in response to a request for authentication. Additionally, the STARKEY Platform may be programmed to store an expected access data record in an exemplary form of [?: RAN] which would indicate that the random number RAN has been generated and would be expected as the response from an as yet unknown cellular device ("?"). While the expected access data record shows a single datapoint for clarity, additional data may be recorded in the expectation record, including without limitation, the internet address (IPE) of the IAPP, permitting the access controlling platform to communicate with and identify the IAPP during the Challenge Response life-cycle, and absent a verified cellular identity having been determined by the MNO and communicated to the access controlling platform, per the disclosed system and methods, furthermore data such as unique IAPP signatures (e.g. GUID, NONCE etc.) that permit the access controlling platform to uniquely identify the IAPP. In some embodiments, this communication is synchronous and bi-directional, utilizing IP Sockets (e.g. Web Sockets). In some embodiments this communication may be asynchronous and/or unidirectional (e.g. Callbacks). In some embodiments, there may be a timing condition event programmed to confirm that the response would be received by the STAR Platform within a predetermined time interval (e.g. 1-30 seconds, 1-60 seconds, 1 120 seconds, 1-180 seconds, etc.).

As shown in FIG. 1B, the illustrative randomized telephone number (the STAR Challenge) 103 may include 12 random decimal digits (XXX XXX XXX XXX) prefixed by the star symbol (*). This 12 digit random number series may be utilized to provide one trillion ($10^{12}$) possible permutations/keys/STAR Challenges. In some embodiments, based on one or more principles disclosed herein, the Star (*) prefix would set a call route that would direct the cellular signals (e.g. cellular call, SMS message) toward the exemplary STARKEY Platform as, for example, without limitation, described in U.S. patent application Ser. Nos. 17/567,044 and 17/567,051.

In some embodiments, based on one or more principles disclosed herein, the random STAR Challenge 103 may be presented as a software button (the access controller interface element) that the user may tap/click, or otherwise activate (e.g. under voice control and/or other biometric trigger). In addition to the STAR Challenge 103, presented as a telephone number, the IAPP may be instructed/programmed to present a barcode (e.g. a telephone number QR code) 104 which would be generated as a result of encapsulation and encoding of the STAR Challenge sequence 103, permitting a user to scan rather than manually dial the STAR Challenge on a cellular phone that may be physically distinct from the IAPP-running device (e.g. desktop/laptop computer, ATM terminal, etc.).

In some embodiments, based on one or more principles disclosed herein, when the IAPP-running device 101 and the cellular phone 105 are one and the same physical device (e.g. a smart phone, an internet enabled cellular device, etc.), the IAPP (e.g. button 103) may be programmed so that by tapping or similarly activating the telephone-displayed button with randomized digits 103, the IAPP would causes to launch, for example, without limitation, a native telephone dialer function of the cellular device 105, with the STAR Challenge, the expected access control digital key, automatically entered as the dial address (telephone number).

In some embodiments, based on one or more principles disclosed herein, once the cellular phone dialer screen (dial pad screen) 105 displays the STAR Challenge telephone number, the user may initiate the call, for example, by pressing a connect call (e.g. typically green in color) button, shown on the bottom of the cellular phone dialer screen 105. In some embodiments, based on one or more principles disclosed herein, on pressing the connect call button, the cellular phone's display may change from the dial pad screen 105 to an active call screen 106, graphical user interface, showing that calling is in progress. In some embodiments, based on one or more principles disclosed herein, during this call setup procedure, the cellular-service enabled device would emit address signals, encoding, for example, without limitation, the STAR Challenge (or the expected access control digital key) 103, to a cellular network (not shown).

In some embodiments, based on one or more principles disclosed herein, on receiving the "*XXX XXX XXX XXX" address signals in the call setup request, a mobile originating switching element (e.g. MSC/gsmSSF) would enter the Originating Basic Call State Model (OBCSM), encountering the Initial Detection Point (e.g. INITDP: DP2 Collected_Info). In some embodiments, the INITDP would establish a call control dialog between the network switching element and a network controlling element (e.g. SCP/gsmSCF). In some embodiments, this switching-controlling dialog may be established utilizing a MAP/SS7 signaling protocol.

In some embodiments, a Mobile Network Operator (MNO) may configure the network switching element, by setting a wildcard (i.e. a default "catch all", routing entry) in the switching element routing table(s), that would route all undefined Star (*)-prefixed numbers to the STARKEY Platform. In some embodiments, such a wildcard routing entry may translate the Star (*) symbolic address into a short internal routing address that may typically, without limitation, include three or four digits that would, in turn, identify a route towards the STARKEY Platform as the destination. In some embodiments, based on one or more principles disclosed herein, similar routing protocol may be followed for any symbolically prefixed STAR Challenges based on one or more symbols (e.g. without limitation "*", "**", "#", "##", etc.).

In some embodiments, based on one or more principles disclosed herein, the MNO may permit all such wildcarded and undefined star calls to proceed without charge, by zero rating all such star numbers. In some embodiments, the MNO may rate all undefined symbol prefixed numbers (e.g., Star number) at a fixed toll/cost that is less than a large monetary unit (e.g., 1 penny to 99 pennies), requiring the network's respective charging elements to ensure that the account associated with the caller has at least the amount of the toll (e.g. a penny) in credit available before continuing the call and routing the call to the STARKEY Platform. In some embodiments, based on one or more principles disclosed herein, call charging and/or rating by various Online Charging Systems (OCS) may be performed as detailed, without limitation, in U.S. patent application Ser. Nos. 17/567,044 and 17/567,051, whose relevant disclosure is incorporated herein for at least such purpose.

In some embodiments, based on one or more principles disclosed herein, on passing, for example, without limitation, a zero rated or one penny credit verification, the network controlling element may be programmed to instruct the network switching element to CONTINUE the call, routing the call request to the STARKEY Platform. In some embodiments, the network billing and/or controlling elements may translate a star (symbolic) address prefix into an internal routing prefix addressing the STARKEY Platform as final switching destination, and then instruct the network switching element to CONNECT the call on the now modified (translated) address. In some embodiments, the network switching element may be programed to route the call along an associated so-called "STAR" trunk to a network gateway or border controller element (e.g. GMSC/SBC), which in turn would translate ISUP IAM call setup signaling into SIP signaling (e.g. SIP INVITE). In some embodiments, based on one or more principles disclosed herein, on receiving a SIP INVITE, the STARKEY Platform would perform a confirmation whether an active [?:RAN] expected access data record exists.

In some embodiments, based on one or more principles disclosed herein, when the active expectation data/record exists, that is the address signals received in the INVITE message matches the sequence and series of the STAR challenge (or the series of random digits of the STAR Challenge, or the expected access control digital key) 103, the STARKEY Platform may be programmed to extract the source phone number (e.g. the calling line identity (CLI)) from the call setup header information (in one non-limiting example, from the SIP P-Asserted-Identity Header). In some embodiments, the CLI may be presented to the STAR Platform in the international e.164 notation so as to present a fully qualified MSISDN. In some embodiments, the STARKEY Platform may be programmed to normalize the CLI into the e.164 format.

In some embodiments, Network Originating Identification (OI) services may be used to provide the information about the source of the call. Usage of the OI is similar to usage of CLI, however OI is extended to cover networks other than the PSTN/ISDN/PLMN. In one embodiment the SIP protocol (e.g. the SIP P-Asserted-Identity Header) is used to carry the OI information, whereas for CLI Signaling System #7(SS7) is used. Furthermore, the OI may consist of different kinds of identifiers, not only E.164 numbers as is the case with CLI.

In at least some embodiments, for example, the Star Challenge/the expected access control digital key may be routed by network switching and routing elements based on a fixed maximum address signal length for a sequence of address signals, specifying, for example, without limitation, the length of the series of digits being greater than or equal to a specified number (e.g. greater than N digits (e.g., 15 digits per e.164 notation). In some embodiments, such address signal length-based routing may permit, for example, without limitation, a network switching element to distinguish and/or switch (route) Star Random telephone number challenges to an access controlling platform (e.g., the Star Platform) by default, even without receiving a routing prefix to the RAN address signals, without the address signals being erroneously interpreted as regular PLMN or PSTN subscriber telephone numbers, thus permitting the MNO to switch purely on address signals exceeding a pre-configured digit count threshold. In one non-limiting example, when the RAN (e.g., the expected access control digital key) is N+1 digits, where N is the maximum regular dial plan number length (e.g. 15 digits per the ETSI e.164 recommendation) then a routing entry (rule) may be set as follows:

IF>N digits THEN route to the access controlling platform (e.g. the STARKEY Platform).

In some embodiments, such OI/CLI identification would, by association and proxy, identify the device and its user. Since many cellular devices may support biometric scanners (e.g., fingerprint, facial recognition input) to secure device access, to ensure that only the true device owner can unlock access to native telephone functions (e.g. the telephony and messaging applications for placing calls and sending messages), the disclosed systems, components, network architectures, and methods for signaling and determining the device identity necessarily, in some embodiments, follows biometric verification of the actual user, required to unlock the device in order to signal. In some embodiments, in signaling and in, for example, signaling using the Star (*) per the disclosed systems, components, network architectures, and methods, the Star Key may now extend the reach of the biometric recognition and verification functionality, resident on and applied locally at the device interface, to being logically and functionally applied remotely at an access controlling platform interface, thereby remotely and biometrically (e.g. fingerprinting) controlling access to restricted online content and services.

In some embodiments, for example, to perform an anonymous authorization, the STARKEY Platform may be programmed to apply at least one cryptographic hash function to encrypt the extracted identity (e.g. MSISDN), resulting in a hashed identity (XMSISDN). In some embodiments, based on one or more principles disclosed herein, on successfully confirming/matching the expected RAN response (e.g. the expected access control digital key), the STARKEY Platform may be programmed to communicate/transmit at least an indicator of a successful identification (access authentication indicator) to the IAPP 107. via, for example, without limitation, the STARKEY API. In some embodiments, the indicator of a successful identification (access authentication indicator) may be a binary indicator (e.g., "1"—successful identification and "0"—failed identification).

In some embodiments, in addition to communicating/transmitting the indicator of successful identification, the access controlling platform may set an authoritative certificate on a communicatively coupled secure datastore (centralized e.g. on a high performance low latency cache, or decentralized, e.g. on a blockchain), registering, in one non-limiting embodiment, an HTTPS accessible certificate for the IAPP to query against, in order to validate the successful Star Random Challenge Response.

For example, without limitation, recording a star XM4 indexed certificate (herein referred without limitation as the "Star Certificate") on a well-known (i.e. developer published) address that third parties may instantly query (e.g. HTTPS GET) in order to validate the Star Transaction, and unlock the access restricted resource. For illustrative non-limiting purposes, wherein the access controlling platform manages the "starkey.com" domain, querying a URL:

HTTPS://CERT.STARKEY.COM/XM4/
EVAL.HTML?cert=<certificate>.

Thus, in one non-limiting embodiment, in addition to communicating/transmitting the indicator of success, the access controlling platform communicates/transmits the recorded Star Certificate, which the IAPP may store and associate with the restricted access resource, for future reference. In one non-limiting embodiment, the IAPP may control the resultant certificate's TTL (Time To Live), for an ephemeral certificate that is automatically, time-lapsed (purged), thereby establishing a remote session based timer in order to gatekeep the restricted access resource (i.e. a semaphore). For example on requesting a Star Challenge, the IAPP may specify a period of time that a successful Response may remain alive (i.e. TTL).

By analogy, this time-lapsed certificate is like a token/pass to board a public transport, valid for a month/week/day/hour etc. On TTL expiry, the access controlling platform datastore, which records these ephemeral certificates, may then automatically purge the certificate and thereby invalidate any subsequent requests to check for its existence (i.e. invalidating access to the public transport at the turnstile, where the token may be inserted).

In one embodiment, the star certificate may store and include a reference (URL, resource ID etc.) to the access restricted resource, thereby permitting the IAPP to not only query the certificate, for existence/validity, moreover it may receive, in response to the query, a reference to the restricted access resource to which the certificate governs access. The above transaction validation URL may thus deliver a remote and virtual cross-domain cookie and session timer. This has further industrial applicability, given the recent developments by prominent internet software companies, to discontinue tracking users by storing cookies locally on their devices (e.g. in the IAPP/browser).

In one embodiment, when a request is made to access a restricted resource, the IAPP or the application servers providing the IAPP functionality (e.g. web servers) may first query the above URL in order to determine whether the previously identified device, with hashed ID XM4, has an active and valid certificate to gain access to the requested resource. In one embodiment the URL queried may return a binary "0" to indicate certificate invalidity, and a binary "1" to indicate certificated validity. In some embodiments, the URL queried may, in addition to returning a binary "1" successful response, may return the time remaining for the certificate (based on the TTL). Absent a valid response to the certificate query, the IAPP may then be directed to request a new Star Challenge and present the same to the user in order to reauthorize access using the cellular signaling systems and methods as disclosed.

In some embodiments, the STARKEY Platform may be programmed to return to the IAPP an access authentication expectation data, including, without limitation, the MSISDN or an XMSISDN, to prevent exposing the MSISDN (cellular phone number) to third parties.

In some embodiments the STARKEY API may be programmed to prepend/append the last N digits (e.g. 4 digits) of the MSISDN to the XMSISDN to generate NXM, XMN, or NXMN (e.g. 4XM, XM4, or 4XM4) as described above, permitting the user to easily identify their own cell. In some embodiments, based on one or more principles disclosed herein, on receiving the successful identification authorization, the IAPP may be instructed/programmed to update the display/interface 101 to present an exemplary display/interface 107, showing, without limitation, an UNLOCKED icon 109, and, per this non-limiting illustration, updating the button 103 to display the identified MSISDN (+YYYYYYYYYYY) 108, as shown, or updating the button 103 to display the last 4 digits of the hashed 4XM/XM4 (YYYY), not shown.

In some embodiments, based on one or more principles disclosed herein, on successfully authenticating the user, the IAPP may be programed/instructed to unlock the at least one access-restricted digital resource (e.g. restricted content, restricted service, etc.) for accessing by the user-associated computing device. In some embodiments, based on one or more principles disclosed herein, an internet service, associated with the at least one access-restricted digital resource, and/or the IAPP may then store the received identity (e.g. MSISDN, XMSISDN, XM4, etc.), for reference in future STARKEY login requests as described herein. In at least some embodiments, whereas the random STAR Random Challenge and Response methods, systems, components, and network architectures disclosed herein seek to uniquely identify the user via, for example, without limitation, their associated cellular phone number (MSISDN) using a randomized dial challenge, once identified, in at least some embodiments, based on one or more principles disclosed herein, for example, the IAPP may be programmed/instructed to restrict access to the predetermined cellular identity only, by requesting any static STAR signal response (for example, a single fixed "*") from the previously identified device. In some embodiments, without limitation, when a user is detected as roaming on a foreign visited network outside their home country, a USSD signal response may be requested (e.g. "* #", or "*111 #", etc.). In some embodiments, in cases of roaming, the STARKEY Platform may detect that the user is roaming on a foreign visited network (e.g. non-primary domestic network for the associated cellular service-enabled device) by inspecting the IP source address of the IAPP requesting authorization, and then may adjust the requested signaling to engage a USSD or an SMS rather than a Telephony transaction protocol and bearer.

[FIG. 2]

Figure 2:
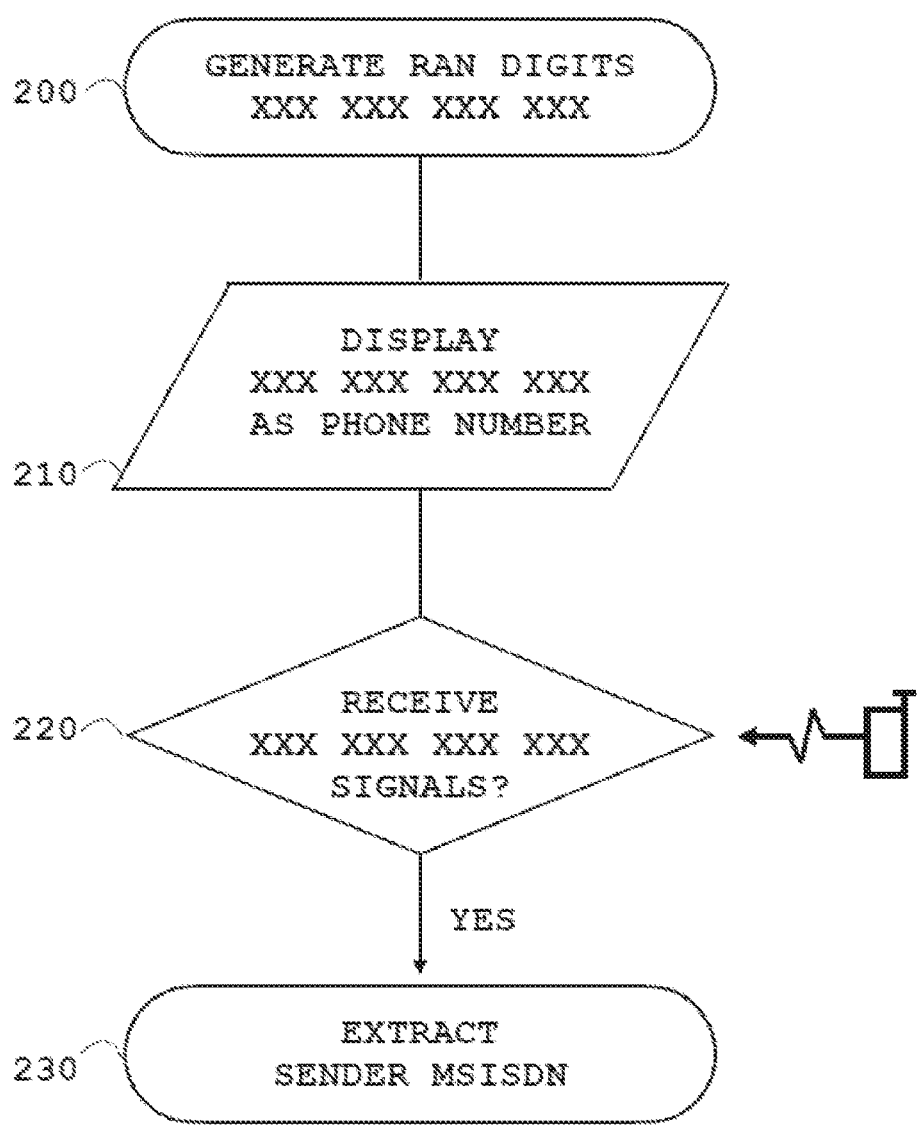
FIG. 2 is an illustrative non-restrictive example of utilizing a cellular-signaled identity management methodology in accordance with novel communications protocol(s) and access controlling network architecture(s) of at least some embodiments of the present disclosure.

FIG. 2 is an illustrative non-restrictive example of utilizing a cellular-signaled identity management methodology in accordance with novel communication protocols and access controlling network architectures of at least some embodiments of the present disclosure. At step 200, in at least some embodiments, based on one or more principles disclosed herein, an exemplary, non-limiting Internet Application (IAPP) may be programmed/instructed to request a device authorization from the STARKEY Platform, for example, without limitation, via an exemplary STARKEY API. In some embodiments, based on one or more principles disclosed herein, the STARKEY platform may be programmed to generate a random series of digits (the STAR Challenge), for example without limitation, 12 random decimal digits, as illustrated, utilizing a random number generator. In some embodiments, based on one or more principles disclosed herein, the STARKEY platform may be programmed to store an access authentication expectation data/record ([?:RAN]) for receiving the digits of the access controlled component of the STAR Challenge in address signals from a cellular network.

At step 210, in at least some embodiments, based on one or more principles disclosed herein, the IAPP may be programmed/instructed to present the digits of the access controlled component of the STAR Challenge ("random STAR Challenge digits") as a telephone number. In at least some embodiments, based on one or more principles disclosed herein, the displayed random STAR Challenge digits may be prefixed, without limitation, with a STAR (*) symbol identifying a call route within the cellular network to the STARKEY Platform. In at least some embodiments, based on one or more principles disclosed herein, the IAPP may be programmed/instructed to append/add the STAR (*) symbol prefix. In at least some embodiments, based on one or more principles disclosed herein, the STAR Platform may be programmed to append/add the STAR (*) symbol prefix to the random STAR Challenge digits to form the STAR Challenge. In at least some embodiments, based on one or more principles disclosed herein, the exemplary STARKEY API may be programmed/instructed to append/add the STAR (*) symbol prefix and output it to the IAPP display. In at least some embodiments, based on one or more principles disclosed herein, on dialing the displayed random telephone number (e.g. the expected access control digital key), the call would progress through the O-BCSM and AAA procedures as described in FIG. 1B above.

At item 220, in at least some embodiments, based on one or more principles disclosed herein, on successfully completing the AAA procedure and the STAR call routing, the STARKEY Platform may be programmed to perform a confirmation whether the address signals received match the expected random series (the access authentication expectation data), digit for digit in sequence.

At item 230, in at least some embodiments, based on one or more principles disclosed herein, when the expected random series of digits would be received, the STARKEY Platform may be programmed to identify a cellular device that emitted the expected random series of digits, by extracting the MSISDN of the cellular device, presented by a network in the signaling headers (e.g. without limitation, inspecting the SIP P-Asserted-Identity header). Accordingly, in at least some embodiments, based on one or more principles disclosed herein, this exemplary, non-limiting random challenge/response system and method are configured to ensure that it is the network and, by direct communicative coupling, the STARKEY Platform that identifies the user by a respective associated identity (e.g. the identity of the cellular device that would have emitted, for example, address signals, enumerating the series and sequence of expected random digits (e.g., random numbers, random alphabetic characters, random alphanumeric characters, etc.).

[FIG. 3]

Figure 3:
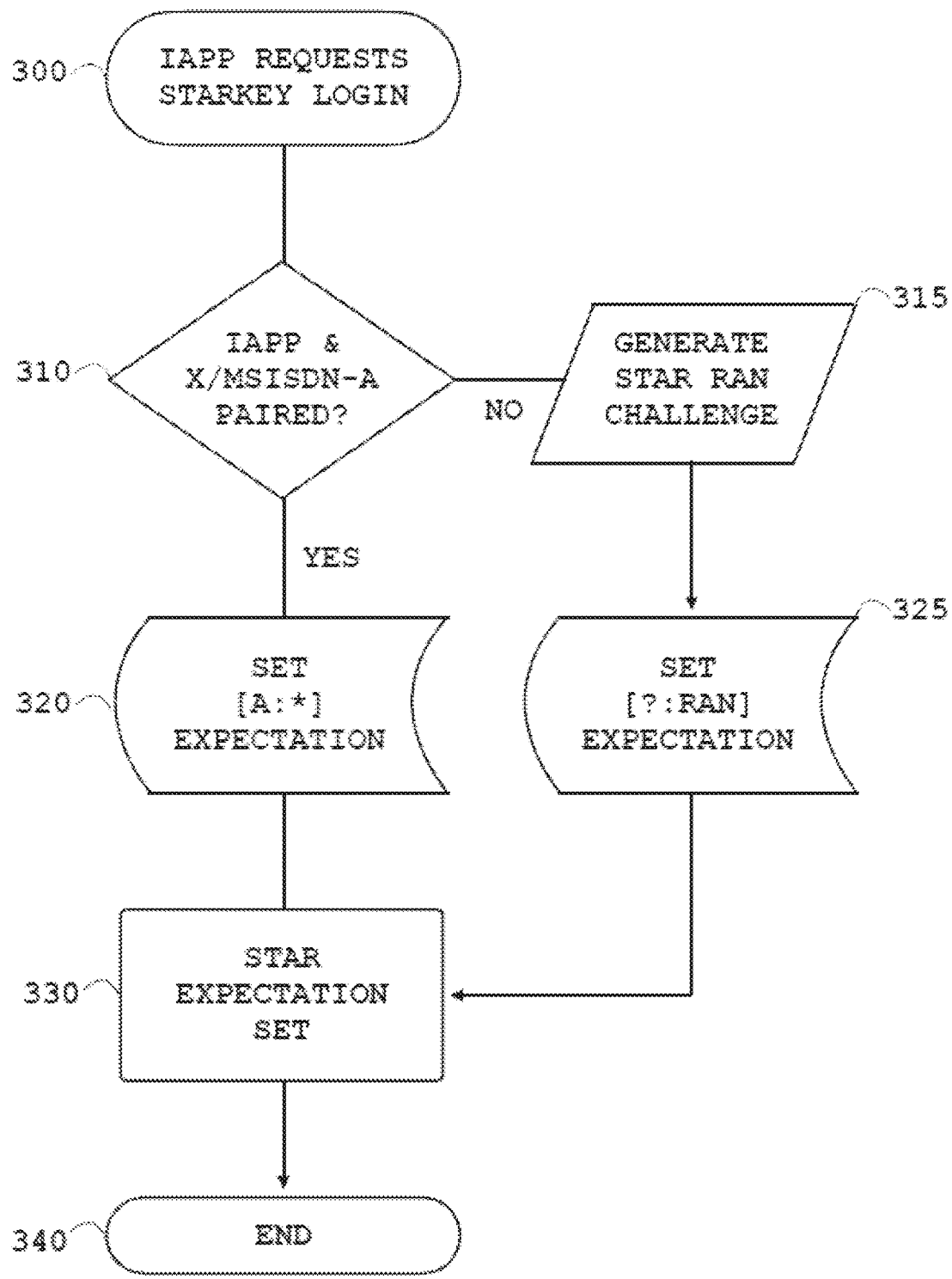
FIG. 3 is an illustrative non-restrictive example of utilizing an expected cellular-signaling management methodology in accordance with novel communications protocol(s) and access controlling network architecture(s) of at least some embodiments of the present disclosure.

FIG. 3 is an illustrative non-restrictive example of utilizing an expected cellular-signaling management methodology in accordance with novel communications protocol(s) and access controlling network architecture(s) of at least some embodiments of the present disclosure.

At step 300, in at least some embodiments, based on one or more principles disclosed herein, an exemplary, non-limiting Internet Application (IAPP) may be programmed/instructed to request a Star Login utilizing an exemplary, non-limiting STARKEY API. In at least some embodiments, based on one or more principles disclosed herein, one or more parameters passed to the STARKEY API may include an MSISDN or a hashed XMSISDN stored from a previous STARKEY authentication (the access authentication expectation data/record).

At step 310, in at least some embodiments, based on one or more principles disclosed herein, the STARKEY Platform may be programmed to determine whether any X/MSISDN has been referenced in the Login Request. When the X/MSISDN has been referenced (the affirmative "YES"), control proceeds to step 320, otherwise absent any previously identified identity (e.g. cellular telephone number), the STARKEY Platform would proceed to step 315.

At step 320, in at least some embodiments, based on one or more principles disclosed herein, the STARKEY Platform may be programmed to perform a confirmation that parameter(s) specified in the STARKEY API include the access authentication expectation data, indicating that this IAPP would have previously identified the user as X/MSISDN-A. Consequently, for example, without limitation, as the cellular identity of the cellular device from which the user would be required to dial/signal is KNOWN, the STARKEY Platform may be programmed to set an access authentication expectation record to the X/MSISDN-A and the expected address signal(s) as ([A:*] or [XA:*]), herein further referenced as Symbol Factor Authentication/Star Factor Authentication (SFA). In this example, based on this access authentication expectation data/record, also interchangeably referenced herein as STAR expectation authentication data/record, to confirm a successful authentication of the user, the STARKEY Platform would thus expect to receive a static single STAR (*) signaled from the cellular device identified as MSISDN-A.

At step 330, in at least some embodiments, based on one or more principles disclosed herein, this STAR expectation authentication data would have thus been set (recorded) and the exemplary access authentication expectation methodology of the present disclosure would proceed to and end at step 340.

At step 315, in at least some embodiments, based on one or more principles disclosed herein, the STARKEY Platform, absent receiving any device identification (e.g. X/MSISDN) reference data via the STARKEY API's Login Request, may be programmed to determine that this is a first time login request by the IAPP, from an as yet UNKNOWN device (e.g. Internet-enable cellular device), and thus may generate a random challenge (RAN), a series of randomized digits, also interchangeably referenced herein, without limitation, as the expected access control digital key, or an access control component of the STAR Challenge, which may be returned via the STARKEY API to the IAPP. The IAPP may then be programmed/instructed to present and display the STAR Challenge to the user, for example, without limitation, as described in FIG. 1B.

At step 325, in at least some embodiments, based on one or more principles disclosed herein, the STARKEY Platform may be programmed to then set an access authentication expectation data/record, storing the expected random series of digits [?,RAN], which seeks to identify the unknown cellular device ("?") that would emit the RAN address signals, and this illustrative, non-limiting process would proceed to step 330. In at least some embodiments, based on one or more principles disclosed herein, the above schematic designation of "?" may be recorded as an empty value, or a null value, for a corresponding parameter in the access authentication expectation data/record or any other similarly suitable placeholder. The "?,RAN" notation grammar is thus used herein, without limitation, to depict an unknown source identity for the RAN signaled digits. In some embodiments, the access authentication expectation record may simply store the expected RAN.

[FIG. 4]

Figure 4:
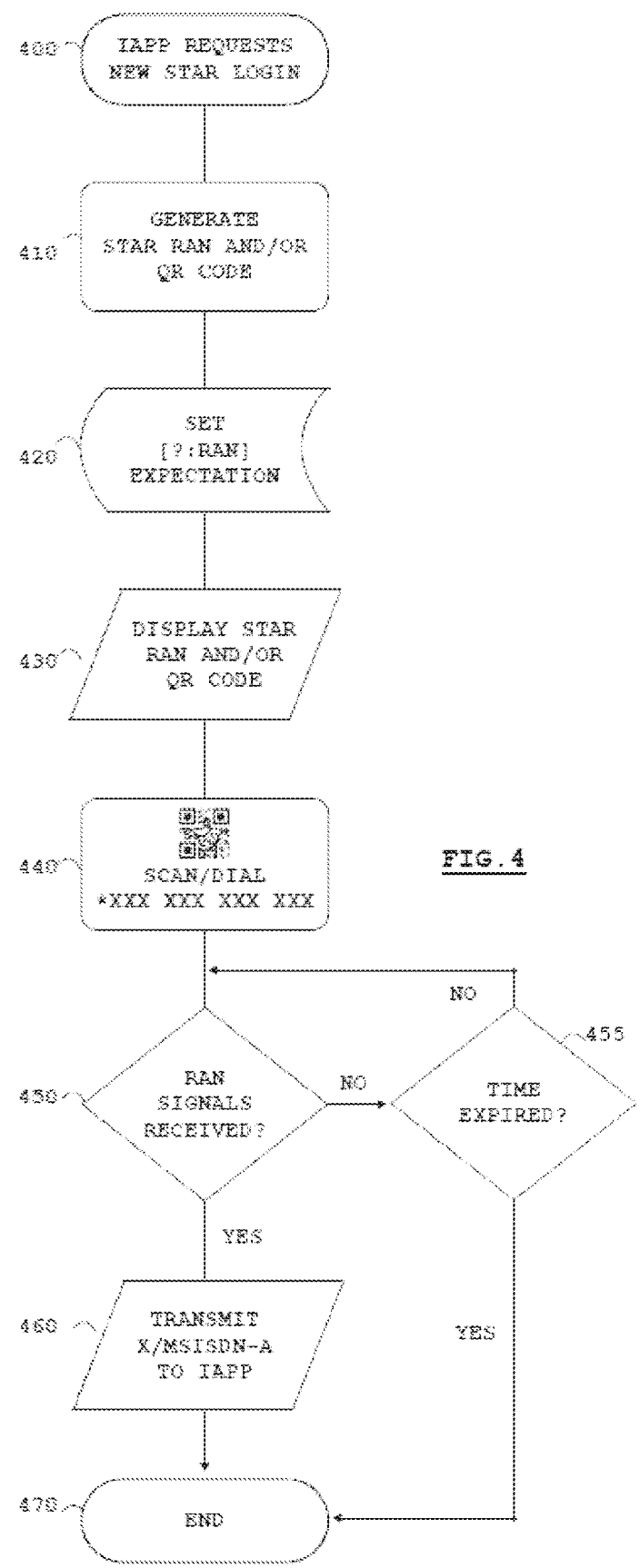
FIG. 4 is an illustrative non-restrictive example of utilizing a cellular-signaled authentication management methodology in accordance with novel communications protocol(s) and access controlling network architecture(s) of at least some embodiments of the present disclosure.

FIG. 4 is an illustrative non-restrictive example of utilizing a cellular-signaled authentication management methodology (the STARKEY authorization) in accordance with novel communications protocol(s) and access controlling network architecture(s) of at least some embodiments of the present disclosure.

At step 400, in at least some embodiments, based on one or more principles disclosed herein, an exemplary, non-limiting internet application (IAPP) may be programmed/instructed to request a new, first time, STAR login utilizing an exemplary, non-limiting STARKEY API. At step 410, in at least some embodiments, based on one or more principles disclosed herein, absent any unique device identifying parameter (e.g. X/MSISDN) communicated via the STARKEY API, the STARKEY Platform may be programmed to generate a random series of digits (RAN), also interchangeably referenced herein, without limitation, as the expected access control digital key, or an access control component of the STAR Challenge, which the IAPP may be programmed/instructed to present to the user, as described, for example, without limitation, in FIG. 1B. In at least some embodiments, in addition to generating the STAR Challenge, the STARKEY Platform may be configured to generate a STARKEY barcode (also referenced herein as the telephone barcode), encapsulating/encoding the STAR Challenge as a telephone number (e.g. FIG. 1B). In at least some embodiments, based on one or more principles disclosed herein, the STARKEY barcode may be in a form of Quick Response (QR) code (also referenced herein as the telephone QR code) or a n-dimension code.

At step 420, the STARKEY Platform may be programed to store an access authentication expectation data/record as [?,RAN] to determine which cellular-service enabled computing device (?) would emit address signals matching the series and sequence of random digits (RAN). In some embodiments, the STARKEY Platform may be programmed to set a validity timer to ensure the STAR Challenge would be received within an acceptable/predetermined period of time, for example, without limitation, within X seconds (e.g., 10 seconds, 20 seconds, 30 seconds, etc.) or X minutes (e.g., 1 minute, 5 minutes, 10 minutes, 15 minutes, etc.), during which the access authentication expectation data record would remain active/valid.

At step 430, in at least some embodiments, based on one or more principles disclosed herein, the IAPP may be instructed/programmed to display a Star (*) prefixed RAN telephone number (e.g. the STAR Challenge) as a button (an access controlling interface element), prompting the user to, for example, without limitation, tap/click and dial the displayed number. In some embodiments, the IAPP may also be programmed/instructed to display the STARKEY barcode (e.g. the telephony QR code) for scanning by a cellular-enabled computing device.

At step 440, in at least some embodiments, based on one or more principles disclosed herein, the user may be required to tap/click or otherwise activate the button with the STAR Challenge (RAN) telephone number and/or scan the STARKEY barcode (e.g. the telephony QR code) to automatically pre-address the telephony connection. For example, on tapping the button with the STAR Challenge the IAPP may be programed to launch a native dialer on a cellular device with the STAR Challenge (RAN) address already entered (e.g. the series of RAN digits, the expected access control digital key) being displayed as the phone number to be dialed, prefixed with one or more symbols (e.g. Star "*" symbol) in order to route the call toward the STARKEY Access Controlling Platform. The user may then simply press a CONNECT/dial/send button (e.g. a green phone icon, a forward arrow for a SMS message, not shown) to transmit the displayed address signals by the associated cellular device.

At step 450, in at least some embodiments, based on one or more principles disclosed herein, the STARKEY Platform may be programmed to await any cellular signals received from an MNO that would match the series and sequence of random digits (RAN) (e.g. the access control component of the Star Challenge, the expected access control digital key). When the RAN-matching signals are not received within an expected period of time, this exemplary process would proceed to the so-called negative "NO" branch to step 455. When the RAN signals are received, the process would proceed along the affirmative "YES" branch to step 460.

At step 455, in at least some embodiments, based on one or more principles disclosed herein, the STARKEY Platform may be programed to determine whether a timer (a computer program configured to track/count time (e.g., countdown time)) set at step 420 has expired. When the timer has expired, the RAN expectation would be deemed invalid (or being invalidated) and flow moves along the affirmative "YES" path to the "END" step 470. When the timer has not expired, the process loops back along the negative "NO" branch to step 450.

At step 460, on receiving the expected and matching RAN sequence and series of signals, the STARKEY Platform may be programmed to extract the sender cellular device's MSISDN from the signaling headers (e.g. the SIP P-Asserted-Identity header). When the access authentication expectation data/record is set to PRIVATE, in at least some embodiments, based on one or more principles disclosed herein, the STARKEY Platform may be programmed to apply a cryptographic hash function to the MSISDN, as described herein, and transmit the identity data of the access authentication expectation data in the form of a hashed XMSISDN (or, for example, XM4 that would include the last 4 digits of the MSISDN in clear text) to the IAPP via the STARKEY API. In some embodiments, when the authorization is set to PUBLIC, the STARKEY Platform may be programmed to transmit the MSISDN in the clear to the IAPP as part of the access authentication expectation data. On successfully transmitting the cellular identity to the IAPP, the process of FIG. 4 proceeds to the "END" step 470.

In some embodiments, when RAN signals (the expected access control digital key, the access control component of the Star Challenge) are received after the time has expired, the STARKEY Platform may be programmed to instruct the IAPP to inform the user that the session has expired and the authentication process needs to be repeated (e.g. for example, by generating a new RAN). In some embodiments, the STARKEY Platform may be programmed to instruct the IAPP (or IAPP may be programmed) to remove displaying the RAN after the timer has expired so to indicate that the user would have to generate another Login Request to access the access-restricted content.

[FIG. 6]

Figure 6:
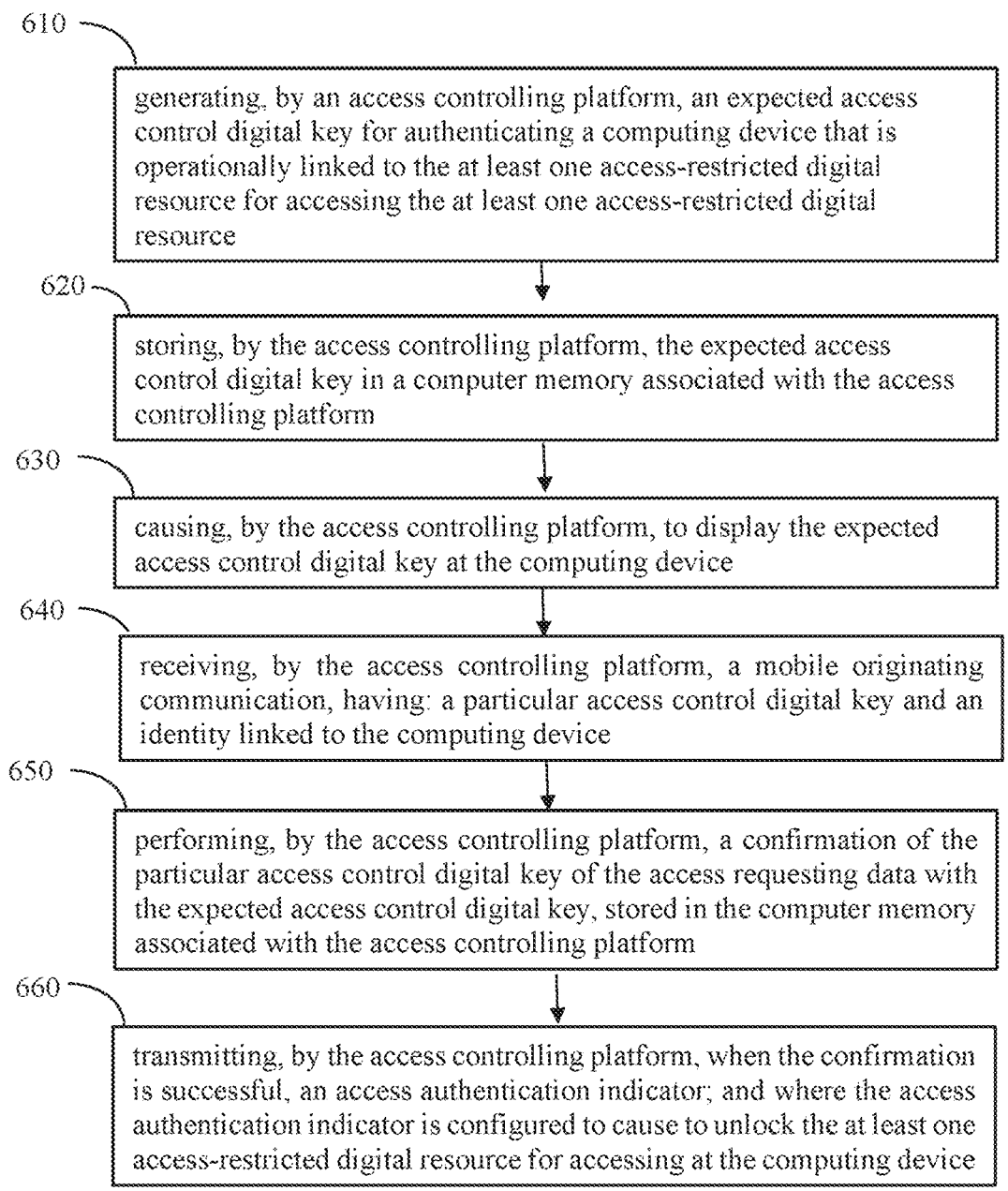
FIG. 6 is an illustrative non-restrictive example of access controlling network architecture(s) utilizing a cellular-signaled access control methodology with expected digital key(s) in accordance with novel communications protocol(s) of at least some embodiments of the present disclosure.

FIG. 6 is an illustrative non-restrictive example of a process based at least in part on cellular communication signals in accordance with at least some embodiments of the present disclosure. In some embodiments, the exemplary process of FIG. 6 may include at least the following steps of: at step 610, generating, by an access controlling platform, an expected access control digital key for authenticating a computing device that is operationally linked to the at least one access-restricted digital resource for accessing the at least one access-restricted digital resource; at step 620, storing, by the access controlling platform, the expected access control digital key in a computer memory associated with the access controlling platform; at step 630, causing, by the access controlling platform, to display the expected access control digital key at the computing device; at step 640, receiving, by the access controlling platform, a mobile originating communication, having: a particular access control digital key and an identity linked to the computing device; at step 650, performing, by the access controlling platform, a confirmation of the particular access control digital key of the access requesting data with the expected access control digital key, stored in the computer memory associated with the access controlling platform; and, at step 660, transmitting, by the access controlling platform, when the confirmation is successful, an access authentication indicator; and where the access authentication indicator is configured to cause to unlock the at least one access-restricted digital resource for accessing at the computing device.

[FIG. 7]

Figure 7:
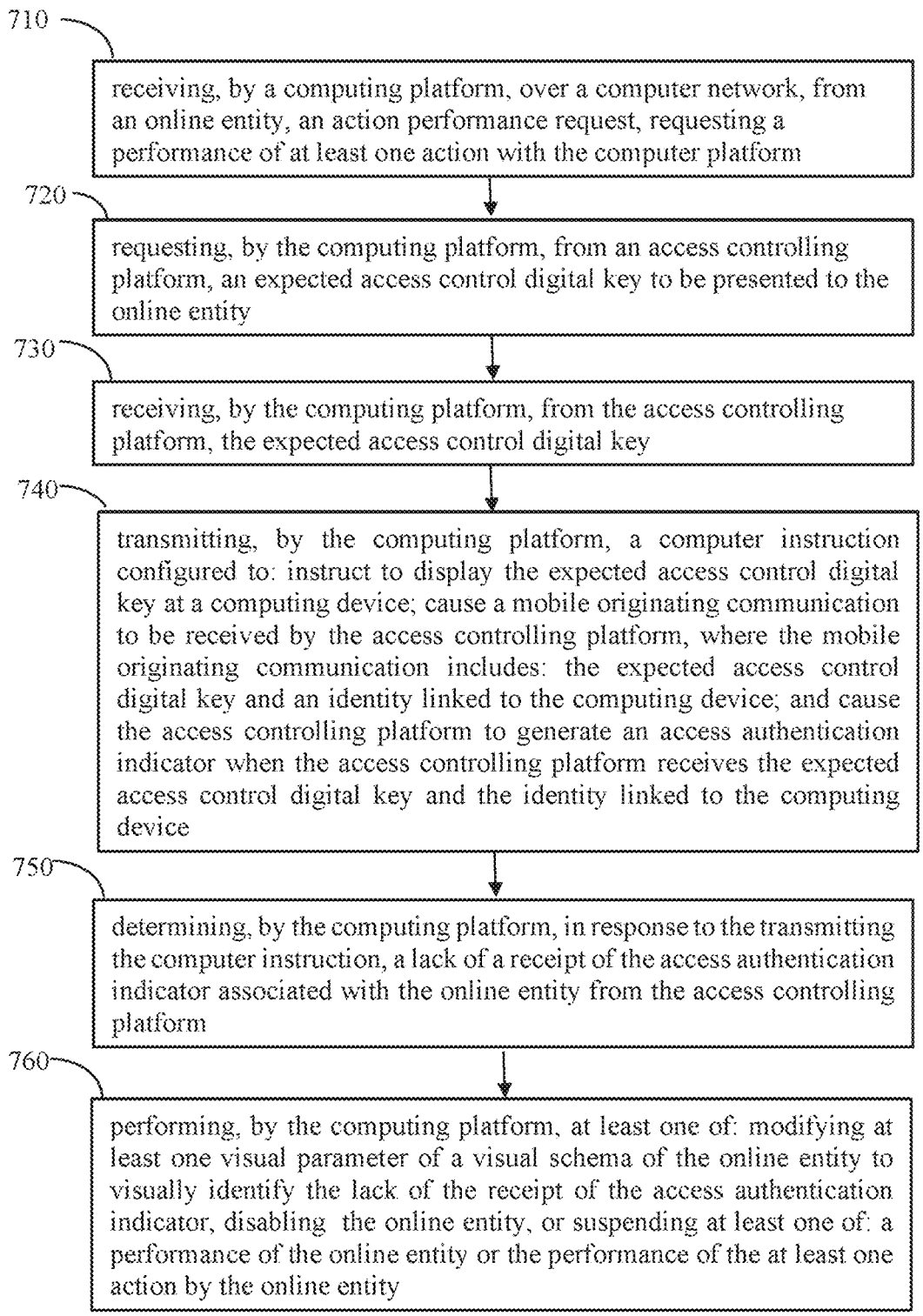
FIG. 7 is an illustrative non-restrictive example of a process based at least in part on cellular communication signals in accordance with at least some embodiments of the present disclosure.

FIG. 7 is an illustrative non-restrictive example of a process based at least in part on cellular communication signals in accordance with at least some embodiments of the present disclosure. In some embodiments, the exemplary process of FIG. 7 may include at least the following steps of: at step 710, receiving, by a computing platform, over a computer network, from an online entity, an action performance request, requesting a performance of at least one action with the computer platform; at step 720, requesting, by the computing platform, from an access controlling platform, an expected access control digital key to be presented to the online entity; at step 730, receiving, by the computing platform, from the access controlling platform, the expected access control digital key; at step 740, transmitting, by the computing platform, a computer instruction configured to: instruct to display the expected access control digital key at a computing device; cause a mobile originating communication to be received by the access controlling platform, where the mobile originating communication includes: the expected access control digital key and an identity linked to the computing device; and cause the access controlling platform to generate an access authentication indicator when the access controlling platform receives the expected access control digital key and the identity linked to the computing device; at step 750, determining, by the computing platform, in response to the transmitting the computer instruction, a lack of a receipt of the access authentication indicator associated with the online entity from the access controlling platform; and, at step 760, performing, by the computing platform, at least one of: modifying at least one visual parameter of a visual schema of the online entity to visually identify the lack of the receipt of the access authentication indicator, disabling the online entity, or suspending at least one of: a performance of the online entity or the performance of the at least one action by the online entity.

[FIG. 8]

Figure 8:
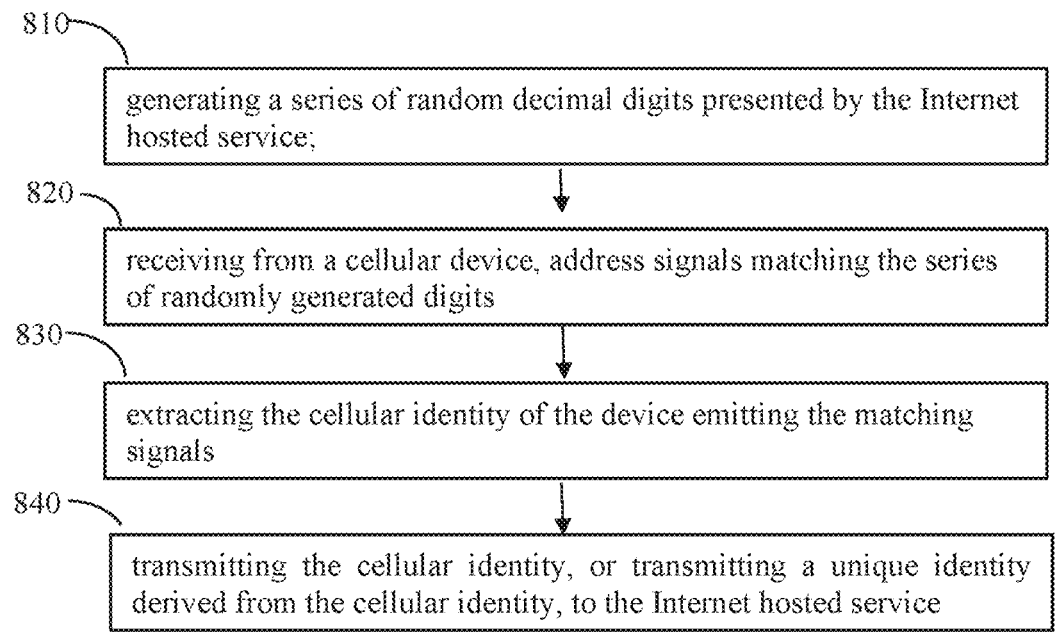
FIG. 8 is an illustrative non-restrictive example of a process based at least in part on cellular communication signals in accordance with at least some embodiments of the present disclosure.

FIG. 8 is an illustrative non-restrictive example of a process based at least in part on cellular communication signals in accordance with at least some embodiments of the present disclosure.

In some embodiments, the exemplary process of FIG. 8 may include at least the following steps of: at step 810, generating a series of random decimal digits presented by the Internet hosted service; at step 820, receiving from a cellular device, address signals matching the series of randomly generated digits; at step 830, extracting the cellular identity of the device emitting the matching signals; and, at step 840, transmitting the cellular identity, or transmitting a unique identity derived from the cellular identity, to the Internet hosted service.

In at least some embodiments, the signals received from the cellular device are address signals in a telephony call setup request.

In at least some embodiments, the extracted cellular identity is the MSISDN of the cellular device.

In at least some embodiments, the extracted cellular identity is the CLI of the cellular device.

In at least some embodiments, the Internet hosted service presents on a display terminal or in a web page or component thereof.

In at least some embodiments, the Internet service is a component in an internet enabled application.

In at least some embodiments, the address signals are symbolically prefixed with a star (*), a pound (#), an at (@) or other symbol, or any combinations of symbols or combination of symbols and routing digits identifying an access controlling platform.

In at least some embodiments, extracting the cellular identity comprises storing an association between the cellular identity and internet hosted service or IAPP.

In at least some embodiments, the internet hosted service is unlocked for access when the expected cellular signals originate from a cellular identity matching the stored and associated cellular identity or an identity derived from a cellular identity.

[FIG. 9]

Figure 9:
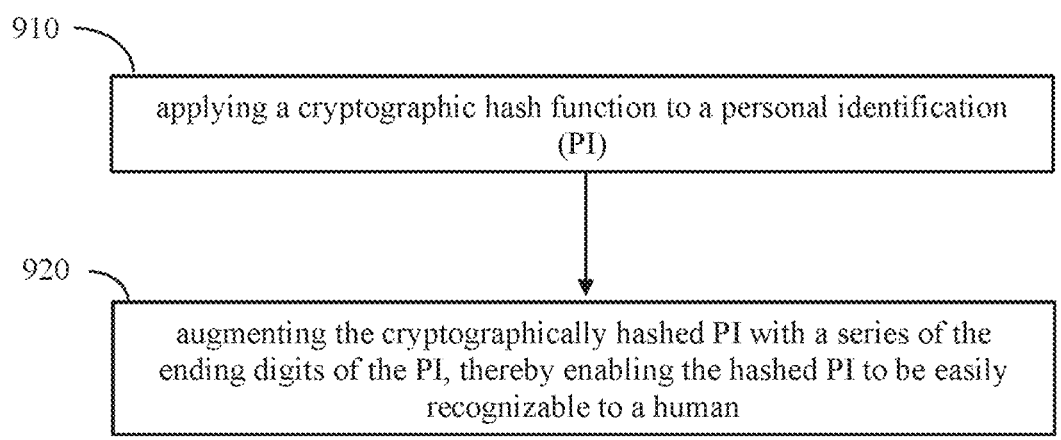
FIG. 9 is an illustrative non-restrictive example of a process based at least in part on cellular communication signals in accordance with at least some embodiments of the present disclosure.

FIG. 9 is an illustrative non-restrictive example of a process based at least in part on cellular communication signals in accordance with at least some embodiments of the present disclosure.

In some embodiments, the exemplary process of FIG. 9 may include at least the following steps of: at step 910, applying a cryptographic hash function to a personal identification (PI); and at step 920, augmenting the cryptographically hashed PI with a series of the ending digits of the PI, thereby enabling the hashed PI to be easily recognizable to a human.

In some embodiments, based on one or more principles disclosed herein, the cryptographically hashed PI may be held in volatile computer memory for ad hoc actions.

In at least some embodiments, the PI is one of an MSISDN, a passport number, a social security number, a national identity number or any globally unique number.

In at least some embodiments, augmenting is by pre-fixing or post-fixing to the cryptographically hashed PI.

In at least some embodiments, the PI is a public or private cryptographic key and the augmented digits are taken from the end (e.g. from the right hand side) of an MSISDN.

In at least some embodiments, the PI is presented or referenced by the augmented digits.

As used herein, the terms "computer element," "network element," and "element" identify at least one software component and/or a combination of at least one software component and at least one hardware component which are designed/programmed/configured to manage/control other software and/or hardware components (such as the libraries, software development kits (SDKs), objects, etc.).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g. a desktop, a web app., etc.). In various implementations of the present disclosure, a final output may be displayed on a displaying screen which may be, without limitation, a screen of a computer, a screen of a mobile device, a screen of an ATM terminal, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, in at least some embodiments, the terms "if" and "when" shall have the same meaning.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session or can refer to an automated software application which receives the data and stores or processes the data.

Examples of hardware elements may include processors, microprocessors, circuits, circuit elements (e.g. transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

At least some aspects of the present disclosure will now be described with reference to the following numbered clauses.

Clause 1. A method includes at least steps of: generating, by an access controlling platform, an expected access control digital key for authenticating a computing device that is operationally linked to at least one access-restricted digital resource for accessing the at least one access-restricted digital resource; storing, by the access controlling platform, the expected access control digital key in a computer memory associated with the access controlling platform; causing, by the access controlling platform, to display the expected access control digital key at the computing device; receiving, by the access controlling platform, a mobile originating communication, having: a particular access control digital key and an identity linked to the computing device; performing, by the access controlling platform, a confirmation of the particular access control digital key of the access requesting data with the expected access control digital key, stored in the computer memory associated with the access controlling platform; transmitting, by the access controlling platform, when the confirmation is successful, an access authentication indicator; and where the access authentication indicator is configured to cause to unlock the at least one access-restricted digital resource for accessing at the computing device.

Clause 2. A system includes the following components: at least one processor in communication with a non-transitory computer readable medium storing application program instructions; where the application program instructions, when executed, cause the at least one processor to: generate an expected access control digital key for authenticating a computing device that is operationally linked to at least one access-restricted digital resource for accessing the at least one access-restricted digital resource; record the expected access control digital key in a computer memory associated with the access controlling platform; cause to display the expected access control digital key at the computing device; receive a mobile originating communication, having: a particular access control digital key and an identity linked to the computing device; perform a confirmation of the particular access control digital key of the access requesting data with the expected access control digital key, stored in the computer memory associated with the access controlling platform; transmit, when the confirmation is successful, an access authentication indicator; and where the access authentication indicator is configured to cause to unlock the at least one access-restricted digital resource for accessing at the computing device.

Clause 3. The method of clause 1, the system of clause 2, or any clause herein, where the mobile originating communication is a telephone call; and where the method further includes: answering, by the access controlling platform, the telephone call and releasing, by the access controlling platform, the telephone call momentarily thereafter, once a sufficient time passes for generating a session data record associated with the identity.

Clause 4. The method of clause 1, the system of clause 2, or any clause herein, where the sufficient time is less than or equal to 1 second.

Clause 5. The method of clause 1, the system of clause 2, or any clause herein, where the mobile originating communication is in accordance with a mobile originating cellular communications protocol.

Clause 6. The method of clause 1, the system of clause 2, or any clause herein, where the mobile originating cellular communications protocol is one of: a Telephone call setup request, a Short Message Service request, or an Unstructured Supplementary Services Data request.

Clause 7. The method of clause 1, the system of clause 2, or any clause herein, where the mobile originating communication is received based on a symbolic routing prefix, including at least one symbol; and where the mobile originating communication includes symbolically prefixed address signals, specifying a combination of the symbolic routing prefix and the particular access control digital key.

Clause 8. The method of clause 1, the system of clause 2, or any clause herein, where the mobile originating communication is received when the mobile originating communication includes address signals, specifying the particular access control digital key that exceeds a pre-determined maximum number of digits.

Clause 9. The method of clause 1, the system of clause 2, or any clause herein, where the pre-determined number of digits exceeds the maximum 15 digits in accordance with a e.164 telephone number address specification.

Clause 10. The method of clause 1, the system of clause 2, or any clause herein, where the identity linked to the computing device is: a cellular identity or derived from the cellular identity; and where the cellular identity identifies: a cellular device that is programmatically associated with the computing device or the computing device that is a cellular service-enabled device.

Clause 11. The method of clause 1, the system of clause 2, or any clause herein, where the cellular identity is one of: a Mobile Station International Subscriber Directory Number (MSISDN), an International Mobile Subscriber Identity (IMSI), an Integrated Circuit Card Identification Number (ICCID), or an International Mobile Equipment Identity (IMEI).

Clause 12. The method of clause 1, the system of clause 2, or any clause herein, where the expected access control digital key is a sequence of numbers or alphanumeric characters.

Clause 13. The method of clause 1, the system of clause 2, or any clause herein, where the generating the expected access control digital key further includes: utilizing, by the access controlling platform, a random generator to generate the sequence of numbers or alphanumeric characters.

Clause 14. The method of clause 1, the system of clause 2, or any clause herein, where the causing to display the expected access control digital key at the computing device, further including: returning, by the access controlling platform, the expected access control digital key or a combination of a symbolic routing prefix and the expected access control digital key to the computing device in response to an application programming interface (API) call.

Clause 15. The method of clause 1, the system of clause 2, or any clause herein, where the causing to display the expected access control digital key at the computing device, further including: transmitting, by the access controlling platform, the expected access control digital key or a combination of a symbolic routing prefix and the expected access control digital key to a provider computing device that is: operationally linked to the at least one access-restricted digital resource to allow for accessing the at least one access-restricted digital resource by the computing device, and configured to instruct the computing device to display the combination of the symbolic routing prefix and the expected access control digital key or a link encoded with the combination of the symbolic routing prefix and the expected access control digital key.

Clause 16. The method of clause 1, the system of clause 2, or any clause herein, further including: encoding, by the access controlling platform, the expected access control digital key or the combination of the symbolic routing prefix and the expected access control digital key into a barcode; where the retuning the expected access control digital key to the computing device in response to the API call, further including: retuning the barcode to the computing device or instructing the computing device to generate the barcode encapsulating the access control digital key; where the causing, by the access controlling platform, to display the expected access control digital key at the computing device, further including: the causing to display the barcode.

Clause 17. The method of clause 1, the system of clause 2, or any clause herein, further including: encoding, by the access controlling platform, the expected access control digital key or the combination of the symbolic routing prefix and the expected access control digital key into a barcode; where the transmitting the expected access control digital key to the provider computing device, further including: transmitting the barcode to the provider computing device; where the provider computing device is further configured to instruct the computing device to display the barcode.

Clause 18. The method of clause 1, the system of clause 2, or any clause herein, where the barcode is a quick response (QR) code or a n-dimension code.

Clause 19. The method of clause 1, the system of clause 2, or any clause herein, where the at least one access-restricted digital resource includes at least one of: an access-restricted internet content or an access-restricted internet service.

Clause 20. The method of clause 1, the system of clause 2, or any clause herein, further including: associating, by the access controlling platform, the access authentication data with an entity that is associated with the provider computing device.

Clause 21. The method of clause 1, the system of clause 2, or any clause herein, further including: generating, by the access controlling platform, when the confirmation is successful, an access authentication expectation data, including an identity data based on the identity; and where the access authentication expectation data, including: a first component that is the identity data and, and a second component that is at least one static symbol; and transmitting, by the access controlling platform, the access authentication expectation data; when the computer device receives an input of the second component of the access authentication expectation data, the input is associated with a request for accessing at least one subsequent access-restricted digital resource: receiving, by the access controlling platform, at least: another mobile originating communication having a particular identity linked to a particular computing device, and an internet-based communication having the first component of the access authentication expectation data; performing, by the access controlling platform, another confirmation of the particular identity to the first component of the access authentication expectation record; transmitting, by the access controlling platform, when the another confirmation is successful, another access authentication indicator that is configured to cause to unlock the at least one subsequent access-restricted digital resource for accessing at the computing device.

Clause 22. The method of clause 1, the system of clause 2, or any clause herein, further including: generating, by the access controlling platform, an access authentication expectation record based on the access authentication expectation data.

Clause 23. The method of clause 1, the system of clause 2, or any clause herein, where the at least one symbol and the at least one static symbol is the same.

Clause 24. The method of clause 1, the system of clause 2, or any clause herein, further including: utilizing, by the access controlling platform, at least one cryptographic hash function to encrypt the identity linked to the computing device into an unique cryptographically hashed identity linked to the computing device; and utilizing, by the access controlling platform, the unique cryptographically hashed identity linked to the computing device to generate at least one component of the identity data.

Clause 25. The method of clause 1, the system of clause 2, or any clause herein, further including: adding, by the access controlling platform, at least one number, at least one alphabetic character, the at least one static symbol, or any combination thereof, to a front of the unique cryptographically hashed identity, to a back of the unique cryptographically hashed identity, or both, to generate the at least one component of the identity data.

Clause 26. The method of clause 1, the system of clause 2, or any clause herein, where the identity linked to the computing device is a cellular identity or derived from the cellular identity; where cellular identity is one of: a Mobile Station International Subscriber Directory Number (MSISDN), an International Mobile Subscriber Identity (IMSI), an Integrated Circuit Card Identification Number (ICCID), or an International Mobile Equipment Identity (IMEI); where the adding the at least one number, the at least one alphabetic character, the at least one static symbol, or any combination thereof, to the front of the cryptographically hashed identity, the back of the cryptographically hashed identity, or both, further including: selecting, by the access controlling platform, the at least one number, the at least one alphabetic character, or both, from the IMSI, the MSISDN, the ICCID, the IMEI, or any combination thereof.

Clause 27. A method that includes at least steps of: receiving, by a computing platform, over a computer network, from an online entity, an action performance request, requesting a performance of at least one action with the computer platform; requesting, by the computing platform, from an access controlling platform, an expected access control digital key to be presented to the online entity; receiving, by the computing platform, from the access controlling platform, the expected access control digital key; transmitting, by the computing platform, a computer instruction configured to: instruct to display the expected access control digital key at a computing device; cause a mobile originating communication to be received by the access controlling platform, where the mobile originating communication includes: the expected access control digital key and an identity linked to the computing device; and cause the access controlling platform to generate an access authentication indicator when the access controlling platform receives the expected access control digital key and the identity linked to the computing device; determining, by the computing platform, in response to the transmitting the computer instruction, a lack of a receipt of the access authentication indicator associated with the online entity from the access controlling platform; and performing, by the computing platform, at least one of: modifying at least one visual parameter of a visual schema of the online entity to visually identify the lack of the receipt of the access authentication indicator, disabling the online entity, or suspending at least one of: a performance of the online entity or the performance of the at least one action by the online entity.

Clause 28. A computer platform that includes at least components of: at least one processor in communication with a non-transitory computer readable medium storing application program instructions; where the application program instructions, when executed, cause the at least one processor to: receive, over a computer network, from an online entity, an action performance request, requesting a performance of at least one action with the computer platform; request, from an access controlling platform, an expected access control digital key to be presented to the online entity; receive, from the access controlling platform, the expected access control digital key; transmit a computer instruction configured to: instruct to display the expected access control digital key at a computing device; cause a mobile originating communication to be received by the access controlling platform, where the mobile originating communication includes: the expected access control digital key and an identity linked to the computing device; and cause the access controlling platform to generate an access authentication indicator when the access controlling platform receives the expected access control digital key and the identity linked to the computing device; determine, in response to the transmitting the computer instruction, a lack of a receipt of the access authentication indicator associated with the online entity from the access controlling platform; and perform at least one of: modifying at least one visual parameter of a visual schema of the online entity to visually identify the lack of the receipt of the access authentication indicator, disabling the online entity, or suspending at least one of: a performance of the online entity or the performance of the at least one action by the online entity.

Clause 29. The method of clause 27, the computer platform of clause 28, or any clause herein, where the modifying the at least one visual parameter of the visual schema of the online entity to visually identify the lack of the receipt of the access authentication indicator, further including: modifying, by the computing platform, the at least one visual parameter of the visual schema to visually identify the online entity to be a BOT.

Clause 30. The method of clause 27, the computer platform of clause 28, or any clause herein, where the at least one action is to establish a user profile in an online environment managed by the computer platform.

Clause 31. The method of clause 27, the computer platform of clause 28, or any clause herein, where the at least one action is to submit an electronic submission to an online environment managed by the computer platform.

Clause 32. The method of clause 27, the computer platform of clause 28, or any clause herein, where the computer platform is a social medial platform; where the electronic submission is an electronic posting; and where the modifying the at least one visual parameter of the visual schema of the online entity to visually identify the lack of the receipt of the access authentication indicator, further including: modifying, by the computing platform, the at least one visual parameter of the posting to visually identify the posting to be from the BOT.

Clause 33. The method of clause 27, the computer platform of clause 28, or any clause herein, where the at least one visual parameter is selected from at least one color theme.

Clause 34. The method of clause 27, the computer platform of clause 28, or any clause herein, where the modifying the at least one visual parameter of the online schema of the online entity to visually identify the lack of the receipt of the access authentication indicator, further including: obtain, by the computing platform, BOT activity data for the BOT; utilizing, by the computing platform, a trained machine-learning model to determine, based on the BOT activity data, at least one classification, at least one ranking, or both, for at least one of: the BOT or the electronic submission; and modifying, by the computing platform, based on the at least one classification, the at least one ranking, or both, at least one of: the at least one visual parameter of the visual schema of the BOT or the at least one visual parameter of the electronic submission by the BOT.

Clause 35. The method of clause 27, the computer platform of clause 28, or any clause herein, where the at least one classification is associated with at least one of: a classification of a plurality of domains, a classification of a plurality of activity categories, or a classification of a plurality of source categories.

Clause 36. The method of clause 27, the computer platform of clause 28, or any clause herein, where the modifying the at least one visual parameter of the visual schema of the BOT, further including: identifying, by the computing platform, based on the at least one classification, a particular theme; and modifying, by the computing platform, the at least one visual parameter based on the particular theme.

Clause 37. The method of clause 27, the computer platform of clause 28, or any clause herein, where the trained machine-learning model that includes a ranking algorithm configured to score the BOT, the electronic submission by the BOT, or both, based on at least one ranking metric selected from at least one of: a number of links referencing the electronic submission, another electronic submission by the BOT, or both; a number of citations referencing the electronic submission, another electronic submission by the BOT, or both; a number of citations referencing the electronic submission, another electronic submission by the BOT, or both; a number of likes associated with the electronic submission, another electronic submission by the BOT, or both; a number of real user follower who follows the BOT; or any combination thereof.

Clause 38. The method of clause 27, the computer platform of clause 28, or any clause herein, where the at least one ranking metric is a confidence ranking.

Clause 39. The method of clause 27, the computer platform of clause 28, or any clause herein, where the at least one confidence ranking is based on a confidence score measured at a particular scale; where the modifying of the at least one visual parameter of the visual schema of the BOT, the at least one visual parameter of the electronic submission, or both, further including: determining, by the computing platform, based on the at least one classification and the confidence score, a particular theme; and modifying, by the computing platform, the at least one visual parameter of the visual schema of the BOT, the at least one visual parameter of the visual schema of the electronic submission, or both, based on the particular theme.

Clause 40. The method of clause 27, the computer platform of clause 28, or any clause herein, where the confidence score is a percent value.

Clause 41. The method of clause 27, the computer platform of clause 28, or any clause herein, where the visual schema of the BOT, the visual schema of the electronic submission, or both, include a schema element having a visual appearance corresponding to the percent value of the confidence score.

Clause 42. The method of clause 27, the computer platform of clause 28, or any clause herein, where the schema element is an arc of a circle; and where a visual completeness of the circle corresponding to the percent value of the confidence score.

Clause 43. The method of clause 27, the computer platform of clause 28, or any clause herein, further including: activating, by the computing platform, in response to the transmitting the computer instruction, a timer having a pre-determine duration; and where the determining the lack of the receipt of the access authentication indicator associated with the online entity from the access controlling platform, further including: determining, by the computing platform, in response to the transmitting the computer instruction and after the time expires, the lack of the receipt of the access authentication indicator associated with the online entity from the access controlling platform.

Clause 44. A method for determining a cellular identity at an internet hosted service including at least steps of: generating a series of random decimal digits presented by the Internet hosted service; receiving from a cellular device, address signals matching the series of randomly generated digits; extracting the cellular identity of the device emitting the matching signals; and transmitting the cellular identity, or transmitting a unique identity derived from the cellular identity, to the Internet hosted service.

Clause 45. The method of clause 44 or any clause herein, the signals received from the cellular device are address signals in a telephony call setup request.

Clause 46. The method of clause 44 or any clause herein, the extracted cellular identity is the MSISDN, ICCID, IMEI, IMSI, of the cellular device.

Clause 47. The method of clause 44 or any clause herein, the extracted cellular identity is the CLI of the cellular device.

Clause 48. The method of clause 44 or any clause herein, the Internet hosted service presents on a display terminal or in a web page or component thereof.

Clause 49. The method of clause 44 or any clause herein, the Internet service is a component in an internet enabled application.

Clause 50. The method of clause 44 or any clause herein, the address signals are symbolically prefixed with a star (*), a pound (#), an at (@) or other symbol, or any combinations of symbols or combination of symbols and routing digits identifying an access controlling platform.

Clause 51. The method of clause 44 or any clause herein, extracting the cellular identity includes storing an association between the cellular identity and internet hosted service or IAPP.

Clause 52. The method of clause 44 or any clause herein, the internet hosted service is unlocked for access when the expected cellular signals originate from a cellular identity matching the stored and associated cellular identity or an identity derived from a cellular identity.

Clause 53. A method of encrypting a personal identification (PI) number that includes at least steps of: applying a cryptographic hash function to the PI; augmenting the cryptographically hashed PI with a series of the ending digits of the PI, thereby enabling the hashed PI to be easily recognizable to a human. In some embodiments, based on one or more principles disclosed herein, the cryptographically hashed PI may be held in volatile computer memory for ad hoc actions.

Clause 54. The method of clause 53 or any clause herein, the PI is one of an MSISDN, ICCID, IMEI, IMSI, a passport number, a social security number, a national identity number or any globally unique number.

Clause 55. The method of clause 54 or any clause herein, the augmenting is by pre-fixing or post-fixing to the cryptographically hashed PI.

Clause 56. The method of clause 54 or any clause herein, the PI is a public or private cryptographic key and the augmented digits are taken from the end (e.g. from the right hand side) of MSISDN, ICCID, IMEI, or IMSI.

Clause 57. The method of clause 54 or any clause herein, the PI is presented or referenced by the augmented digits.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method comprising:
receiving, by a computing platform, over a computer network, from an online entity, an action performance request, requesting a performance of at least one action with the computer platform;
wherein the online entity comprises a verification indicator indicating a default unverified status of the online entity;
requesting, by the computing platform, from an access controlling platform, an expected access control digital key to be presented to the online entity, the expected access control digital key providing a verification mechanism for verification of the online entity as human;
receiving, by the computing platform, from the access controlling platform, the expected access control digital key;
transmitting, by the computing platform, a computer instruction configured to:
cause a mobile originating communication to be received by the access controlling platform, wherein the mobile originating communication comprises:
the expected access control digital key and
an identity linked to a computing device;
modifying, by the access controlling platform, the verification indicator from the default unverified status to a verified status in response to the access controlling platform receiving the expected access control digital key and the identity linked to the computing device, the verified status indicating the verification of the online entity as human;
allowing, by the computing platform, based on the verified status,
the performance of the at least one action by the online entity.

2. The method of claim 1, wherein the verification status comprises an indication whether the online entity is operated by a bot or human; and
wherein the default unverified state comprises an indication that the computing device is operated by the bot.

3. The method of claim 2, further comprising:
causing to display, by the computing platform, the indication for an access-restricted digital resource in the default unverified state so as to indicate the computing device being operated by the bot; and
in response to the confirmation being successful, modifying, by the computing platform, the indication to the verified state; wherein the indication indicates the verification of the computing device being operated by the human.

4. The method of claim 1, further comprising:
obtain, by the computing platform, online entity activity data for the online entity; and
utilizing, by the computing platform, a trained machine-learning model to determine, based on the online entity activity data, at least one classification, at least one ranking, or both, representative of the verification of the online entity.

5. The method of claim 4, wherein the trained machine-learning model is configured to output the at least one ranking based on at least one ranking metric selected from at least one of:
a number of links referencing an electronic submission, another electronic submission by the online entity,
a number of citations referencing the electronic submission,
a number of likes associated with the electronic submission, or
a number of real user followers who follow the online entity.

6. The method of claim 1, further comprising:
receiving, by the computing platform, at least one electronic submission from the online entity; and
modifying, by the computing platform, based on the verification indicator, at least one of: at least one visual parameter of a visual schema of the online entity or the at least one visual parameter of the electronic submission by the online entity.

7. The method of claim 1, wherein the at least one action is to establish a user profile in an online environment managed by the computer platform.

8. The method of claim 1, wherein the mobile originating communication comprises symbolically prefixed address signals specifying the access code.

9. The method of claim 1, further comprising:
transmitting, by the computing platform to the online entity, prior to the receiving the expected access control digital key, at least one application program instruction to display the verification indicator on a screen of the computing device in a visual association with a visual indication of the online entity.

10. The method of claim 1, further comprising:
confirming, by the computing platform, that the mobile originating communication has been received within a predetermined time period from the generating of the expected access control digital key.

11. A system comprising:
a computing platform comprising at least one processor in communication with at least one non-transitory computer readable medium having software instructions stored thereon, wherein the computing platform is configured, upon execution of the software instructions, to perform steps to:
receive, over a computer network, from an online entity, an action performance request, requesting a performance of at least one action with the computer platform;
wherein the online entity comprises a verification indicator indicating a default unverified status of the online entity;
request from an access controlling platform, an expected access control digital key to be presented to the online entity, the expected access control digital key providing a verification mechanism for verification of the online entity as human;
receive from the access controlling platform, the expected access control digital key;
transmit a computer instruction configured to:
cause a mobile originating communication to be received by the access controlling platform, wherein the mobile originating communication comprises:
the expected access control digital key and
an identity linked to a computing device;
modify the verification indicator from the default unverified status to a verified status in response to the access controlling platform receiving the expected access control digital key and the identity linked to the computing device, the verified status indicating the verification of the online entity as human;
allow, based on the verified status, the performance of the at least one action by the online entity.

12. The system of claim 11, wherein the verification status comprises an indication whether the online entity is operated by a bot or human; and
wherein the default unverified state comprises an indication that the computing device is operated by the bot.

13. The system of claim 12, wherein the computing platform is further configured, upon execution of the software instructions, to perform steps to:
cause to display the indication for an access-restricted digital resource in the default unverified state so as to indicate the computing device being operated by the bot; and
in response to the confirmation being successful, modify, by the computing platform, the indication to the verified state; wherein the indication indicates the verification of the computing device being operated by the human.

14. The system of claim 11, wherein the computing platform is further configured, upon execution of the software instructions, to perform steps to:
obtain online entity activity data for the online entity; and
utilize a trained machine-learning model to determine, based on the online entity activity data, at least one classification, at least one ranking, or both, representative of the verification of the online entity.

15. The system of claim 14, wherein the trained machine-learning model is configured to output the at least one ranking based on at least one ranking metric selected from at least one of:
a number of links referencing an electronic submission, another electronic submission by the online entity,
a number of citations referencing the electronic submission,
a number of likes associated with the electronic submission, or
a number of real user followers who follow the online entity.

16. The system of claim 11, wherein the computing platform is further configured, upon execution of the software instructions, to perform steps to:
receive at least one electronic submission from the online entity; and
modify based on the verification indicator, at least one of:
at least one visual parameter of a visual schema of the online entity or the at least one visual parameter of the electronic submission by the online entity.

17. The system of claim 11, wherein the at least one action is to establish a user profile in an online environment managed by the computer platform.

18. The system of claim 11, wherein the mobile originating communication comprises symbolically prefixed address signals specifying the access code.

19. The system of claim 11, wherein the computing platform is further configured, upon execution of the software instructions, to perform steps to:
transmit, to the online entity, prior to the receiving the expected access control digital key, at least one application program instruction to display the verification indicator on a screen of the computing device in a visual association with a visual indication of the online entity.

20. The system of claim 11, wherein the computing platform is further configured, upon execution of the software instructions, to perform steps to:
confirm that the mobile originating communication has been received within a predetermined time period from the generating of the expected access control digital key.

* * * * *